United States Patent
Komatsu et al.

(10) Patent No.: US 8,814,338 B2
(45) Date of Patent: *Aug. 26, 2014

(54) INK JET RECORDING METHOD, INK SET, AND RECORDED MATTER

(75) Inventors: Hidehiko Komatsu, Chino (JP); Tetsuya Aoyama, Shiojiri (JP); Takashi Oyanagi, Matsumoto (JP); Kazuaki Tsukiana, Azumino (JP)

(73) Assignee: Seiko Epson Corporation (JP)

( * ) Notice: Subject to any disclaimer, the term of this patent is extended or adjusted under 35 U.S.C. 154(b) by 187 days.

This patent is subject to a terminal disclaimer.

(21) Appl. No.: 13/205,753

(22) Filed: Aug. 9, 2011

(65) Prior Publication Data

US 2012/0040147 A1    Feb. 16, 2012

(30) Foreign Application Priority Data

Aug. 11, 2010  (JP) ................. 2010-180114

(51) Int. Cl.
*C09D 11/00* (2014.01)
*B41M 5/00* (2006.01)

(52) U.S. Cl.
CPC .......... *B41M 5/0064* (2013.01); *B41M 5/0047* (2013.01); *C09D 11/54* (2013.01); *C09D 11/36* (2013.01); *B41M 5/0011* (2013.01); *C09D 11/322* (2013.01); *B41M 5/0023* (2013.01); *B41M 5/0017* (2013.01)
USPC ....................................................... 347/100

(58) Field of Classification Search
USPC ....................................................... 347/100
See application file for complete search history.

(56) References Cited

U.S. PATENT DOCUMENTS

| | | | |
|---|---|---|---|
| 7,891,799 B2 | 2/2011 | Edwards et al. | |
| 8,192,010 B2 | 6/2012 | Edwards et al. | |
| 8,313,572 B2 | 11/2012 | Oyanagi et al. | |
| 8,317,311 B2 | 11/2012 | Edwards et al. | |
| 8,430,498 B2 | 4/2013 | Edwards et al. | |
| 8,740,367 B2 | 6/2014 | Edwards et al. | |
| 2003/0129414 A1* | 7/2003 | Ota et al. ............. | 428/426 |
| 2005/0090581 A1 | 4/2005 | Oyanagi | |
| 2005/0179759 A1* | 8/2005 | Yoshida et al. ........ | 347/105 |
| 2007/0036984 A1 | 2/2007 | Hama et al. | |
| 2007/0076069 A1* | 4/2007 | Edwards et al. ....... | 347/100 |

(Continued)

FOREIGN PATENT DOCUMENTS

| | | |
|---|---|---|
| JP | 04-010973 B2 | 1/1992 |
| JP | 2005-68250 A | 3/2005 |

(Continued)

OTHER PUBLICATIONS

Patent Abstract of Japan JP2005-68250A Published Mar. 17, 2005.

(Continued)

*Primary Examiner* — Laura Martin
(74) *Attorney, Agent, or Firm* — Harness, Dickey & Pierce, P.L.C.

(57) ABSTRACT

An ink jet recording method for recording a non-water-based glitter ink on a recording medium, including forming an underlayer, in which a resin ink in which resin components are dispersed or dissolved in a dispersion medium is applied to at least a site of the recording medium on which the non-water-based glitter ink is recorded, thereby forming an underlayer, and recording a glitter ink, in which the non-water-based glitter ink is recorded on the underlayer.

12 Claims, 2 Drawing Sheets

(56) References Cited

U.S. PATENT DOCUMENTS

| | | |
|---|---|---|
| 2008/0145628 A1 | 6/2008 | Oyanagi |
| 2008/0152825 A1 | 6/2008 | Mukai et al. |
| 2008/0182083 A1 | 7/2008 | Oyanagi et al. |
| 2008/0241397 A1* | 10/2008 | Kato et al. .................. 427/288 |
| 2009/0214833 A1 | 8/2009 | Oyanagi |
| 2009/0233065 A1 | 9/2009 | Komatsu |
| 2010/0009136 A1 | 1/2010 | Oyanagi et al. |
| 2010/0026751 A1 | 2/2010 | Oyanagi et al. |
| 2010/0207973 A1* | 8/2010 | Sano et al. .................. 347/6 |
| 2011/0200797 A1 | 8/2011 | Mukai et al. |
| 2011/0200799 A1 | 8/2011 | Mukai et al. |
| 2013/0101810 A1 | 4/2013 | Mukai et al. |
| 2013/0242016 A1 | 9/2013 | Edwards et al. |
| 2014/0098158 A1 | 4/2014 | MUKAI et al. |

FOREIGN PATENT DOCUMENTS

| | | |
|---|---|---|
| JP | 2005-088220 A | 4/2005 |
| JP | 2006-281570 A | 10/2006 |
| JP | 2007-023161 A | 2/2007 |
| JP | 2007-46034 A | 2/2007 |
| JP | 2007-046034 A | 2/2007 |
| JP | 2008-174712 A | 7/2008 |
| JP | 2008-208332 A | 9/2008 |
| JP | 2008-213451 | 9/2008 |
| JP | 2008-221478 A | 9/2008 |
| JP | 2008-272953 | 11/2008 |
| JP | 2008-294308 A | 12/2008 |
| JP | 2009-507692 A | 2/2009 |
| JP | 2009-107283 A | 5/2009 |
| JP | 2009-220436 A | 10/2009 |
| JP | 2010-18651 A | 1/2010 |
| JP | 2010-30139 A | 2/2010 |
| JP | 2010-052207 A | 3/2010 |
| WO | WO-2007-033031 A2 | 3/2007 |

OTHER PUBLICATIONS

Patent Abstract of Japan JP2007-46034A Published Feb. 22, 2007.
Patent Abstract of Japan JP2008-174712A Published Jul. 31, 2008.
Patent Abstract of Japan JP2008-208332A Published Sep. 11, 2008.
Patent Abstract of Japan JP2010-18651A Published Jan. 28, 2010.
Patent Abstract of Japan JP2010-30139A Published Feb. 12, 2010.
European Search Report in Application 11176925, search completed Apr. 27, 2012.
Patent Abstract of Japan JP2008-272953 Published Nov. 13, 2008.
Patent Abstract of Japan JP2008-213451 Published Sep. 18, 2008.

* cited by examiner

INK JET RECORDING METHOD, INK SET, AND RECORDED MATTER

Priority is claimed under 35 U.S.C §119 to Japanese Application No. 2010-180114 filed on Aug. 11, 2010, which is hereby incorporated by reference in its entirety.

BACKGROUND

1. Technical Field

The present invention relates to an ink jet recording method, an ink set, and recorded matter.

2. Related Art

Recently, demand has been increasing for recorded matter on which a glitter image is formed on a recording surface. As for a method for forming a glitter image, recording has been carried out in the related art, for example, by a foil-pressing and recording method in which a recording medium including a recording surface having high flatness is prepared and a metal foil is pressed and adhered thereon to carry out recording, a method in which a metal or the like is vapor-deposited on a plastic film having a smooth recording surface, or a method in which a glitter pigment ink is applied onto a recording medium and a press process is carried out thereon.

As for an ink having a glitter pigment (hereinafter appropriately referred to as a glitter ink) and an ink jet recording method, for example, in JP-A-2008-174712, it is disclosed that a solvent for partially melting a substrate which is a non-absorbing material is used in an ink composition. However, in the case of such a solvent, it is possible to obtain good glitter in polyvinyl chloride-based plastics as a non-absorbing material. However, in non-absorbing materials having extremely low solubility, such as plastic, metal, glass, and the like, or materials having extremely low absorptivity, if an ink-receiving layer is not provided, a solvent or the like undergoes convection before the ink is dried and the smoothness of a surface of a glitter pigment is lost, and as a result, problems such as deterioration in gloss, and the like occur. Further, even with the absorbing materials, in the case of a recording medium having insufficient surface smoothness such as plain paper, although the glitter pigment is recorded with an ink jet, the smoothness of the glitter pigment is not sufficient, and accordingly, it is difficult to obtain good glitter due to diffused reflection of light. In addition, in the case of carrying out recording on a non-absorbing material or a material having extremely low absorptivity, there is a problem in that the adhesiveness of a glitter pigment onto a recording medium is not sufficient and good abrasion resistance cannot be obtained.

As described above, in the case of obtaining an image having glitter from a glitter pigment ink in the related art, it is necessary to select a recording medium, taking into consideration smoothness and acceptability of the ink, and accordingly, it cannot be said that the versatility is high.

For such a reason, with a recording medium having low solubility in a solvent included in a glitter pigment, such as plastics, metals, glass, and the like, or a recording medium having a rough surface, referred to as plain paper, it is difficult to form an image having sufficient glitter with a glitter pigment ink in the related art. Further, good abrasion resistance cannot be obtained with some recording media.

SUMMARY

As described above, an advantage of some aspects of the invention is to record an image having good glitter and abrasion resistance on various recording media. The means for gaining the advantage is as follows.

Application 1

An ink jet recording method for recording a non-water-based glitter ink having a glitter pigment dispersed therein on a recording medium by an ink jet, the method including forming an underlayer, in which a resin ink in which resin components are dispersed or dissolved in a dispersion medium is applied to at least a site of the recording medium on which the non-water-based glitter ink is recorded, thereby forming an underlayer, and recording a glitter ink, in which the non-water-based glitter ink is recorded on the underlayer, wherein the recording medium is a non-absorbing or low ink-absorbing recording medium or a recording medium having an arithmetic mean roughness Ra of the surface, on which the resin ink is recorded, of 20 µm or more.

Thus, an ink jet recording method by which an image having excellent glitter can be recorded (formed) can be provided.

Application 2

The ink jet recording method as described in Application 1, wherein the arithmetic mean roughness Ra of the underlayer is 20 µm or less.

Thus, an image having particularly excellent glitter can be recorded (formed).

Application 3

The ink jet recording method as described in Application 1 or 2, wherein the gloss at 60° of the underlayer is 20 or more.

Thus, recorded matter having superior glitter can be formed.

Application 4

The ink jet recording method as described in any one of Applications 1 to 3, which includes firstly forming an underlayer, which includes drying the underlayer.

Thus, recorded matter having superior glitter can be formed with higher efficiency.

Application 5

The ink jet recording method as described in Application 4, wherein the drying temperature in drying is 30° C. or higher and 120° C. or lower.

Thus, recorded matter having superior glitter can be formed with a higher efficiency.

Application 6

The ink jet recording method as described in Application 1 to 3, which includes secondly forming an underlayer, which does not include drying the underlayer.

Since these components have an excellent film forming property, a smoother underlayer can be formed, and as a result, the glitter of the image formed can be further improved. Further, the adhesiveness of the image onto the recording medium can be further enhanced and the abrasion resistance can be superior.

Application 7

The ink jet recording method as described in any one of Applications 1 to 6, wherein the resin component is at least one selected from the group consisting of a styrene-acrylic acid copolymer and a polyurethane.

Thus, an underlayer having higher efficiency can be formed.

Application 8

An ink set including the glitter ink and the resin ink, which is used in the ink jet recording method as described in any one of Applications 1 to 7.

Thus, an ink set capable of recording (forming) an image having both of excellent glitter and excellent abrasion resistance can be provided.

Application 9

Recorded matter recorded by the ink jet recording method as described in any one of Applications 1 to 8.

Thus, recorded matter on which an image having excellent glitter is recorded can be provided.

DESCRIPTION OF EXEMPLARY EMBODIMENTS 1.1. Ink Jet Recording Apparatus

Hereinbelow, one embodiment of the invention will be explained by way of an example in which an ink jet type printer is used as a recording apparatus with reference to the drawings.

Figure 1:
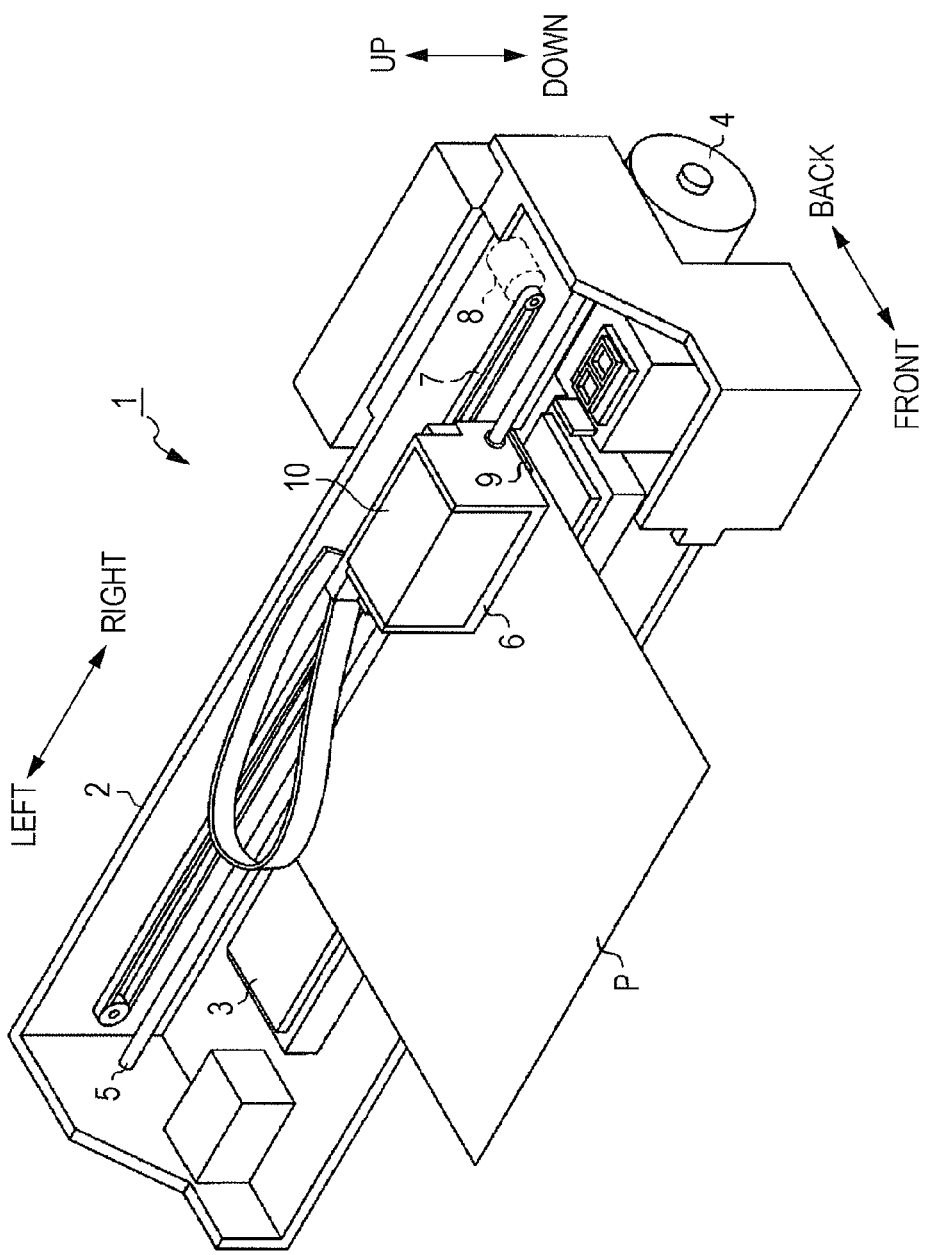
FIG. 1 is a perspective view showing the schematic structure of an ink jet apparatus.

As shown in FIG. 1, an ink jet type printer 1 (hereinafter referred to as a printer 1) as a recording apparatus has a frame 2. In the frame 2, a platen 3 is provided, in which paper P is fed to the platen 3 by a recording medium feed motor 4. Further, in the frame 2, a rod-shaped guide member 5 is provided in parallel to the longitudinal direction of the platen 3.

In the guide member 5, a carriage 6 is supported so as to reciprocate in the axial direction of the guide member 5. The carriage 6 is connected to a carriage motor 8 via a timing belt 7 provided in the frame 2. Further, the carriage 6 is moved so as to reciprocate along the guide member 5 by the driving of the carriage motor 8.

A head 9 is provided in the carriage 6 and also an ink cartridge 10 for feeding the ink as a liquid to the head 9 is detachably disposed. The ink in the ink cartridge 10 is fed from the ink cartridge 10 to the head 9 by the driving of a piezoelectric element provided in the head 9 (not shown), and thus discharged to a recording medium P fed onto the platen 3 from plural nozzles formed on the nozzle forming surface of the head 9. Thus, it becomes possible to prepare recorded matter.

The recording method may be a thermal ink jet (Bubble Jet (registered trade mark)) system. Further, any of known methods in the related art may be used.

1.2. Ink Jet Recording Method
1.2.1. Step of Forming Resin Ink Layer

Formation of a resin ink layer (hereinafter appropriately referred to forming) in the ink jet recording method according to the present embodiment is to forming a layer from the resin ink as described later on the recording medium. The means for forming the layer is not particularly limited, but a known technique can be chosen. For example, the layer may be formed by the head 9 using the ink jet recording apparatus as described above or may be applied by an analog coater used in the related art, such as a bar coater, a blade coater, a roll coater, a spray coater, a slit coater, and the like. When the ink jet recording apparatus is used, it is possible to form layers at any place, which is thus favorable. On the other hand, the analog coater is excellent in terms of a wide limit range of the viscosity of the resin ink and high-speed application of the ink. Examples of the commercially available products of the analog coater include a K Hand Coater (manufactured by Matsuo Industry Corporation), a Bar Coater (manufactured by Daiichi Rika Co., Ltd.), a Capilary Coater of Small & Low Capacity Type (manufactured by Hirano Tecseed Co., Ltd.), a No. 579 Bar Coater (manufactured by Yasuda Seiki Seisakusho Ltd.), and the like.

As one of the functions of the layer formed in the present process, enabling the solvent in the glitter ink to penetrate into the layer, thereby aligning the glitter pigment flatly on the surface of the recording medium may be given. Further, as one of the functions of the layer formed in the present process, improving the flatness of the surface on which the glitter layer is formed may be given. Further, there are a case where the layer is clearly separated from the glitter layer as described later and a case where the interface therebetween is not clearly separated. In addition, as one of the functions of the layer formed in the present process, improving the abrasion resistance of the glitter ink (recorded matter) may be given.

Furthermore, in forming a resin ink layer, the surface roughness of the formed resin ink layer is preferably 20 μm or less. Further, in the present specification, the "surface roughness" means an arithmetic mean roughness (Ra) defined in accordance with JIS B 0601:2001. With this, even with a recording medium such as plain paper having a higher surface roughness, the glitter pigment is aligned smoothly, whereby high gloss (glitter) is exhibited. Moreover, the formed resin ink layer may vary according to the type of the recording medium. For example, with a recording medium having a smooth surface layer, from the viewpoint of the amount of the ink consumed and prevention of the unevenness of the recorded matter, it is preferable that the resin ink layer be thin within an acceptable range of the dispersion medium in the glitter ink. However, in the case of the recording medium having an extremely low solubility in the solvent of the glitter ink in the recording medium having no ink-receiving layer, the surface layer is full of the dispersion medium in the glitter ink, and thus, the glitter pigment tends not to be aligned smoothly. As a result, it is preferable that the film thickness of the resin ink layer be higher than those of other kinds of recording media. If the drying proceeds while the dispersion medium is not accommodated well, the glitter pigment of the surface layer is not easily aligned smoothly.

Furthermore, the surface roughness of the resin ink layer has a close relationship with the gloss of the resin ink layer. It also has a close relationship with the glossy of the resin ink layer and the glossy of the glitter ink layer as in FIG. 2 as described later. As for the preferable refractive index range (1.4 to 1.6) of the resin included in the resin ink according to an aspect of the invention of the present application, the gloss at 60° of the resin ink layer is preferably 20 or more, more preferably 45 or more, even more preferably 70 or more, and still even more preferably 90 or more. Here, the gloss at 60° of the resin can be measured using a commercially available glossmeter and the gloss at 60° of the resin ink layer as described above is a value measured at a swing angle of 60° using a glossmeter (Minolta Multi Gloss 268).

By way of another example, in the case where the surface of the recording medium is highly rough, it is necessary to increase the film thickness of the resin ink layer in order to smoothen the surface, while in the case where the surface of the recording medium is relatively flat, the smoothness can be attained even with a small film thickness of the resin ink layer.

As a means for increasing the film thickness, in the case of an ink jet recording method, it is preferable to increase the recording intensity (duty). Here, the "duty" is a value calculated by the following equation:

Duty(%)=Actual number of recorded dots/(Vertical resolution×Horizontal resolution)×100

(wherein the "actual number of recorded dots" is an actual number of recorded dots per unit area, and the "vertical resolution" and the "horizontal resolution" each represent a resolution per unit area).

Moreover, the recording method may include firstly forming an underlayer, which includes drying, and secondly forming an underlayer, which does not include drying. Thus, in the case where recorded matter having high gloss (glitter) is desired, an underlayer is formed in firstly forming an underlayer and then recorded, and in the case where recorded matter having slightly suppressed gloss is desired, an underlayer is formed in secondly forming an underlayer and then recorded, whereby it is possible to express a further wider range of gloss. Further, in the case where a recording medium having a region having high gloss and a region having slightly suppressed gloss is desired, it is possible to obtain recorded matter having desired gloss by providing drying involving partially heating (for example, partially blowing warm air, partially heating a platen, and the like). Further, by carrying out recording with the glitter ink in a region in which slightly suppressed gloss is desired (using secondly forming an underlayer) and then including drying to carry out recording again with the glitter ink in a region in which high gloss is desired (using firstly forming an underlayer), recorded matter having desired gloss can be obtained. That is, in this case, formation of an underlayer, which is first carried out, corresponds to secondly forming an underlayer, and a combination of formation of an underlayer which is firstly carried out and drying which is carried out after recording with the glitter ink corresponds to firstly forming an underlayer.

As a heating means, the platen 3 may be heated to function as a heater, radiant heat may be used for heating by a heated wire or the like, or a means for blowing warm air into an apparatus may be provided, and correspondingly heating may be performed. Further, other known heating means may be used. Further, drying in which the shape of the smooth surface of the underlayer can be maintained early is effective, but is not necessarily provided. In addition, the method for maintaining the shape of the underlayer may be a method for curing a resin ink using active energy rays. The active energy rays are not particularly limited as long as they can apply energy capable of generating an initiation species from a polymerization initiator, and examples thereof widely include α-rays, γ-rays, β-rays, ultraviolet rays, visible light, an electron beam, and the like. In particular, from the viewpoint of curing sensitivity and easy availability of an apparatus, the active energy rays are preferably ultraviolet rays and an electron beam, and particularly preferably ultraviolet rays.

The underlayer formed in the present process is not particularly limited in its amount or thickness as long as the arithmetic mean roughness of the recording medium is small, but the arithmetic mean roughness Ra is preferably 20 μm or less, and more preferably 10 μm or less. Thus, the glitter pigment can be aligned more smoothly on the surface of the recording medium, whereby it is possible to record (form) an image having particularly excellent glitter.

The film thickness of the resin ink layer is preferably 0.1 to 30 μm, and more preferably from 1 to 15 μm. If the film thickness of the resin ink layer is less than 0.1 μm, an effect of penetrating the glitter ink into a solvent or an effect of smoothening the glitter pigment may be insufficient in some cases.

1.2.2. Step of Forming Glitter Layer

Formation of a glitter layer in the ink jet recording method according to the present embodiment is carried out by discharging liquid droplets of the glitter ink on the underlayer using the above-described ink jet recording apparatus to be adhered on the recording medium. As one of the functions of the glitter layer formed in the present process, forming a glitter side on the recording medium may be given. The film thickness of the glitter layer is preferably 0.02 to 10 μm, and more preferably 0.05 to 5 μm. If the film thickness of the glitter layer is less than 0.02 μm, the transmitted light to the reflected light on the surface of the glitter layer is increased, and consequently, it may be impossible to obtain sufficient glitter in some cases.

Formation of a glitter layer can be carried out, for example, at room temperature of around 25° C. or at a higher temperature. In a case where plain paper is chosen as the recording medium, formation of a glitter layer can be carried out at a higher temperature, for example, 20 to 150° C., preferably 25 to 110° C., more preferably 30 to 100° C., and particularly preferably 40 to 90° C. Thus, the drying rate when the solvent is contained in the glitter ink can be increased.

Further, the recording method may include a firstly forming an underlayer including drying and a secondly forming an underlayer not including drying. Thus, in the case where recorded matter having high gloss (glitter) is desired, an underlayer is formed in firstly forming an underlayer and then recorded, and in the case where recorded matter having slightly suppressed gloss is desired, an underlayer is formed in secondly forming an underlayer and then recorded, whereby it is possible to exhibit a further wider range of gloss. Further, in the case where a recording medium a region having high gloss and a region having slightly suppressed gloss is desired, it is possible to obtain recorded matter having a desired gloss by providing drying of partially heating (for example, partially blowing warm air, partially heating a platen, and the like).

Further, by carrying out recording with the glitter ink in a region in which slightly suppressed gloss is desired (using secondly forming an underlayer) and then including drying to carry out recording again with the glitter ink in a region in which slightly suppressed gloss is desired (using firstly forming an underlayer), recorded matter having desired gloss can be obtained. That is, in this case, forming an underlayer which is first carried out corresponds to secondly forming an underlayer, and a combination of forming an underlayer which is firstly carried out and drying which is carried out after recording with the glitter ink corresponds to firstly forming an underlayer.

1.3. Recording Medium

In the present embodiment, the recording medium to be recorded is not particularly limited, and for example, a non-ink-absorbing or low ink-absorbing recording medium or a recording medium with a rough surface can be preferably used.

The "non-ink-absorbing or low ink-absorbing recording medium" refers to a recording medium having no ink receiving layer or having an insufficient ink receiving layer. More quantitatively, the non-ink-absorbing or low-ink absorbing recording medium refers to a recording medium in which the recording surface has a water absorption amount from the initiation of contact to 30 $msec^{1/2}$ in a Bristow method of 10 $mL/m^2$ or less. The Bristow method is the most popular method as a method for measuring a liquid absorption amount in a short time, and is also employed in Japan Technical Association of the Pulp and Paper Industry (JAPAN TAPPI). The details of a test method are described in "Liquid Absorbency Test Method of Paper and Paperboard—Bristow Method" of No. 51 of "JAPAN TAPPI Paper Pulp Test Method, 2000".

Examples of such a non-ink-absorbing recording medium include one in which plastics are coated or plastic films are adhered on a base, such as a plastic film, paper, and the like, which have not been surface-treated for ink jet recording (i.e., have no ink-receiving layer), and the like. Examples of the plastic as mentioned herein include polyvinyl chloride, polyethylene terephthalate, polycarbonate, polystyrene, polyurethane, polyethylene, polypropylene, and the like.

Examples of the low ink-absorbing recording medium include coated paper and also include recording sheets (printing sheets), such as light weight coated paper, art paper, coated paper, matte paper, cast paper, and the like.

Coated paper is paper having increased esthetic sense and smoothness by applying paint on the surface. The paint is made by mixing pigments such as talc, pyrophyllite, clay (kaolin), titanium oxide, magnesium carbonate, calcium carbonate, and adhesives such as starch, polyvinyl alcohol. The paint is applied using a machine called a coater in preparation of paper. The coater may be an on-machine type coater in which paper-making/coating is one operation by direct connection to a paper-making machine or an off-machine type coater in which coating is separated from paper making. The coated paper is mainly used for recording and classified into coated paper for printing in "Classification of Dynamic Statistics of Production", Ministry of Economy, Trade and Industry.

The light weight coated paper refers to recording paper having a coating amount of a paint of 12 $g/m^2$ or less. The art paper refers to recording paper having a paint coated at an amount of about 40 $g/m^2$ on high-level recording paper (wood free paper, paper having a rate of chemical pulp used of 100%). The coated paper refers to recording paper having a paint coated at an amount of about 20 $g/m^2$ to 40 $g/m^2$. The cast paper refers to recording paper finished so as to provide art paper or coat paper with further increased gloss or recording effect by applying a pressure on the surface using a machine called a cast drum.

Here, the recording medium having a rough surface refers to a recording medium in which the surface roughness of the recording medium to be a region for recording is 20 to 100 µm. The surface roughness can be measured, for example, by using a surface roughness meter or an optical interference type microscope. Examples of the recording medium having a rough medium include Xerox P (manufactured by Fuji Xerox Co., Ltd.; Ra=29.2), Plain/Design Paper Black Paper (manufactured by Tochiman Co., Ltd.; Ra=30.2), Superfine Paper (manufactured by Seiko Epson Corporation; Ra=36.6), a B Flute Corrugated Board (manufactured by Rengo Co., Ltd.; arithmetic mean roughness Ra=39.9 µm), and the like. In addition, as for the recording medium, the recording medium having a smooth surface means a recording medium having an arithmetic surface roughness Ra of less than 3, and examples thereof include photo paper <Glossy> (manufactured by Seiko Epson Corporation; Ra=1.1), Photo Paper Entry (manufactured by Seiko Epson Corporation; Ra=2.4), and the like. Examples of the apparatus for measuring the surface roughness include a Stepped/Surface Roughness/Fine Shape Measurement Apparatus P-15 (manufactured by KLA-Tencor Corporation), and the like.

2. Ink Set

The ink set for ink jet recording according to an aspect of the invention of the present application is an ink set used for recording an image having glitter on a recording medium using an ink jet recording apparatus, and includes a resin ink and a non-water-based glitter pigment ink (hereinafter also referred to as a glitter ink).

Further, examples of the ink set include an ink set including at least a resin ink and a non-water-based glitter pigment ink. The ink set may include one or a plurality of the inks and the ink set may further include one or a plurality of inks containing other ink. Examples of other inks included in the ink set include color ink such as cyan, magenta, yellow, light cyan, light magenta, dark yellow, red, green, blue, orange, violet, and other colored ink, black ink, and light black ink.

2.1. Resin Ink

The water-based resin ink according to the present embodiment includes a water-soluble resin solvent and a resin, which is miscible with the water-soluble resin solvent, as a resin component. Being miscible indicates that when a resin is mixed with a water-soluble resin solvent, the resin is dissolved or its particles are swollen therein. Further, the ink resin in the invention may be any of a water-based ink (having a moisture content of 50% or more) and a non-water-based ink (having a moisture content of less than 50%). With reference to a specific example regarding a case of the water-based ink, each of the components will be explained below.

1. Water

Water is a main medium for an aqueous ink and is preferably provided for the purpose of removing ionic impurities as much as possible. As the water, pure water such as ion exchanged water, ultrafiltration water, reverse osmosis water, distilled water, and the like, or ultrapure water can be used. Further, when water that has been sterilized by irradiation with ultraviolet rays or addition of hydrogen peroxide, or the like is used, generation of mold or bacteria can be prevented when a pigment dispersion and aqueous ink using the same are stored over a long period of time, which is thus preferable.

2. Water-Soluble Resin Solvent

The water-soluble resin solvent is selected from water-soluble solvents that are compatible with the resin simultaneously added to the resin ink. Although an optimum combination varies in accordance with a resin to be used, for example, water-soluble heterocyclic compounds, water-soluble alkylene glycol alkyl ethers, and the like are preferred, and pyrrolidones such as N-methyl-2-pyrrolidone, N-ethyl-2-pyrrolidone, N-vinyl-2-pyrrolidone, 2-pyrrolidone, and the like, lactones such as γ-butyrolactone and the like, sulfoxides such as dimethyl sulfoxide and the like, lactams such as ϵ-caprolactam and the like, esters such as methyl lactate, ethyl lactate, isopropyl lactate, butyl lactate, and the like, oxyalkylene glycol ethers such as ethylene glycol monomethyl ether, ethylene glycol dimethyl ether, ethylene glycol monomethyl ether acetate, diethylene glycol monomethyl ether, diethylene glycol dimethyl ether, diethylene glycol ethyl methyl ether, diethylene glycol diethyl ether, diethylene glycol isopropyl ether, propylene glycol monomethyl ether, propylene glycol dimethyl ether, dipropylene glycol monomethyl ether, dipropylene glycol dimethyl ether, dipropylene glycol monopropyl ether, and the like, and cyclic ethers such as 1,4-dioxane and the like are more preferred. In particular, pyrrolidones and alkylene glycol monoalkyl ethers such as propylene glycol monomethyl ether, dipropylene glycol monomethyl ether, dipropylene glycol monopropyl ether, and the like are preferred from the viewpoint of preservation stability of the resin ink, a sufficient drying rate, and promotion of the film formation of the underlayer.

The water-soluble resin solvent is effective for further strengthening the film formation with the resin ink.

The amount of the water-soluble resin solvent to be added is preferably 1.0% by mass to 50.0% by mass, and more preferably 4.0% by mass to 25.0% by mass, based on the total amount of the resin ink. When the amount of the water-soluble resin solvent to be added is less than 1.0% by mass, there is a difficulty in film formation of the resin and the underlayer forming wax in the resin ink, and thus insufficient solidification/fixation of the resin ink may be caused in some cases. On the other hand, when the amount of the water-soluble resin solvent to be added is more than 50% by mass, the preservation stability of the resin ink may be deteriorated in some cases.

3. Resin

The resin can form a strong resin film after drying the resin ink by using the resin together with the water-soluble resin solvent. Further, a film can be prepared at a temperature which is lower than the original glass transition temperature of the resin.

For use in the ink jet recording apparatus, the viscosity of each ink can be inhibited to be low with the addition of sufficient amounts of the resin components to the resin ink by using a resin insoluble in water and the discharging stability in the high-speed recording can be ensured, which is thus preferable. When the resin is discharged from the head onto the recording medium and dried, the solvent, such as, typically water, that is a main component in ink starts to evaporate first, and as a result, the water-soluble resin solvent in ink is concentrated, and thus the resin is in the dissolved state. Consequently, as the components of the water-soluble resin solvent evaporate, the dissolved resin (which is not a particle because it is dissolved) forms a strong film.

Specific examples of the water-insoluble resin include polyacrylic acid, polymethacrylic acid, polymethacrylic ester, polyethylacrylic acid, styrene-butadiene copolymers, polybutadiene, acrylonitrile-butadiene copolymers, chloroprene copolymers, fluorine resins, vinylidene fluoride, polyolefin resins, cellulose, styrene-acrylic acid copolymers, styrene-methacrylic acid copolymers, polystyrene, styrene-acrylamide copolymers, polyisobutyl acrylate, polyacrylonitrile, polyvinyl acetate, polyvinyl acetal, polyamide, rosin-based resins, polyethylene, polycarbonate, vinylidene chloride resins, cellulose resins, vinyl acetate resins, ethylene-vinyl acetate copolymers, vinyl acetate-acrylate copolymers, vinyl chloride resins, polyurethane, rosin esters, and the like, but are not limited thereto.

The resins may be mixed with other components in the aqueous ink as fine particulate powder, but are preferably included in ink as a resin emulsion. This is because since resin particles may be dispersed insufficiently in some cases when they are added to the ink in a particle form; an emulsion form is preferred in terms of their dispersion. Further, in terms of the preservation stability of the resin ink, the acrylic emulsion is preferred, and a styrene-acrylic acid copolymer emulsion is more preferred.

In the specification of the present application, the "resin particles" include a water-insoluble resin that disperses in a dispersion medium mainly composed of water in a particulate form or a water-insoluble resin that is dispersed in a dispersion medium mainly composed of water in a particulate form as well as a dried matter thereof. In addition, the "emulsion" includes solid/liquid dispersion forms called a dispersion, a latex, and a suspension.

When the resin is obtained in an emulsion form, the emulsion can be prepared by mixing the resin particles with a surfactant and water, if necessary. For example, the emulsion of an acrylic resin or a styrene-acrylic acid copolymer resin can be obtained by mixing a (meth)acrylate resin or a styrene-(meth)acrylate resin with water. If necessary, the emulsion can be obtained by mixing a (meth)acrylate resin and a surfactant with water. The mixing ratio of the resin component and the surfactant is preferably about 50:1 to 5:1. When the amount of the surfactant does not satisfy the range, an emulsion is not easily formed. When the amount of the surfactant exceeds the range, the water resistance of the ink may be decreased or the adhesion may be deteriorated in some cases, which is thus not preferable.

A commercially available resin emulsion can be used as the resin emulsion, and examples thereof include Microgel E-1002 and E-5002 (styrene-acrylic resin emulsions manufactured by Nippon Paint Co., Ltd.), Bon Coat 4001 (acrylic resin emulsion manufactured by Dainippon Ink and Chemicals Inc.), Bon Coat 5454 (styrene-acrylic resin emulsion manufactured by Dainippon Ink and Chemicals Inc.), SAE1014 (styrene-acrylic resin emulsion manufactured by Nippon Zeon Corporation), Rezamin D-1060 (urethane-based resin emulsion; manufactured by Dainichiseika Colour & Chemicals Mfg. Co., Ltd.), and Saibinol SK-200 (acrylic resin emulsion manufactured by Saiden Chemical Industry Co., Ltd.).

The resin is preferably included in an amount ranging from 1% by mass to 50% by mass, in terms of solids, and preferably from 4% by mass to 25% by mass, based on the total amount of the resin ink. For the preferable range of the resin content, the upper limit is stipulated in consideration of optimum ink jet physical properties and reliability (clogging, discharging stability, or the like) of the resin ink, and the lower limit is stipulated so as to effectively achieve the effect (abrasion resistance or the like) of the invention.

4. Wax

The water-based resin ink may further include a wax. In this regard, the wax is characterized in that it decreases the frictional resistance of an ink film surface after drying. Examples of the component constituting the wax include plant/animal-derived waxes such as carnauba wax, candelilla wax, beeswax, rice wax, lanolin, and the like; petroleum waxes such as a paraffin wax, a microcrystalline wax, a polyethylene wax, a polyethylene oxide wax, petrolatum, and the like; mineral waxes such as a montan wax, ozokerite, and the like; synthetic waxes such as a carbon wax, a Hoechst wax, a polyolefin wax, stearic acid amide, and the like; natural/synthetic wax emulsions such as an α-olefin-maleic anhydride copolymer; blended waxes; and the like. These waxes can be used singly or in combination thereof. Among these waxes, polyolefin wax, particularly polyethylene wax and polypropylene wax are preferred. Furthermore, polyethylene wax is more preferred in consideration of abrasion resistance to a non-ink-absorbing or low ink-absorbing recording medium. A commercially available wax can be used as it is. Examples of the commercially available wax include Nopcoat PEM17 (trade name, manufactured by San Nopco Limited), Chemipearl W4005 (trade name, manufactured by Mitsui Chemicals, Inc.), Aquacer 515 and Aquacer 593 (trade name, manufactured by BYK-Chemie, Japan K. K.), and the like.

The wax content in the water-based resin ink in terms of solids is preferably 0.5% by mass to 6% by mass, and more preferably 1% by mass to 3% by mass. For the preferable range of the wax content, the upper limit is stipulated in consideration of optimum ink jet physical properties and reliability (clogging, discharging stability, or the like) of the resin ink, and the lower limit is stipulated so as to effectively achieve the effect (abrasion resistance or the like) of the invention.

With regard to the recorded matter in which a layer is formed with the above-described resin ink and a layer of the glitter pigment is recorded thereon, the glitter pigment can be aligned smoothly on the surface layer, and thus, the gloss increases. Further, consequently, it is possible to exhibit the glitter even with a recording medium in the related art, which cannot exhibit the glitter. Further, the abrasion resistance as the recorded matter is improved, and thus, a strong underlayer can be formed. The reason why the abrasion resistance is improved is still unclear, but is inferred as follows. The resin has characteristics that it is firmly fixed on a recording medium, and simultaneously strengthens the resin film after drying. On the other hand, the wax has characteristics that it decreases the frictional resistance of a resin film surface. As a result, a resin film that is not easily shaved off due to rubbing from the outside and is not easily detached from the recording medium can be formed. Thus, it is believed that the abrasion resistance of the recorded matter is improved. In addition, if the layer is formed with the resin ink, there are effects that the resin ink exhibits a function as an ink-receiving layer and the bleeding of the glitter pigment onto the recording medium is prevented, and thus, it becomes possible to carry out good recording. Even when it is possible to improve the fixability and drying properties of the glitter ink itself drastically, it is necessary to increase the average particle diameter of the pigment particles in order to ensure the glossiness. Accordingly, it is also possible to lower the recording reliability when the recording is carried out from the head and cause clogging or deteriorated recording, and thus, it is advantageous to form a resin ink layer since there is no problem as described above.

5. Other Components

The resin ink optionally includes a water-soluble solvent and a surfactant as other components. The amounts thereof to be added can be suitably adjusted in accordance with the types of the recording medium and the ink. Examples of other optional additives include a humectant, a preservative/fungicide, a pH adjuster, a solubilizing aid, an antioxidant/ultraviolet light absorber, a metal trapping agent, and the like.

5-1. Water-Soluble Solvent

In a synergic combination with a surfactant as described later, a water-soluble solvent functions to increase the wettability of the color ink to a recording medium so as to achieve uniform wettability. Therefore, it is preferable that the water-soluble solvent be contained in the resin ink because an underlayer can be formed uniformly. Examples of the water-soluble solvent include a monohydric alcohol or a polyhydric alcohol, and a derivative thereof.

As the monohydric alcohol, particularly monohydric alcohols having 1 to 4 carbon atoms, such as methanol, ethanol, n-propanol, i-propanol, n-butanol, and the like, can be used.

As the polyhydric alcohol and a derivative thereof, divalent to pentavalent alcohols having 2 to 6 carbon atoms and an ether or a partial ether between the divalent alcohol to the pentavalent alcohol and a lower alcohol having 1 to 4 carbon atoms can be used. Here, a polyhydric alcohol derivative is an alcohol derivative in which at least one hydroxyl group is etherified and is not a polyhydric alcohol itself that does not include an etherified hydroxyl group.

Specific examples of the polyhydric alcohol and the lower alkyl ether thereof include diols such as 1,2-hexanediol, 1,3-hexanediol, 1,2-heptanediol, 1,3-heptanediol, 1,2-octanediol, 1,3-octanediol, 1,2-pentanediol, and the like; mono-, di-, or triethylene glycol-mono- or dialkyl ethers; and mono-, di-, or tripropylene glycol-mono- or dialkyl ethers, and preferably 1,2-hexanediol, triethylene glycol monobutyl ether, diethylene glycol monobutyl ether, diethylene glycol monopropyl ether, diethylene glycol monopentyl ether, propylene glycol monobutyl ether, and the like.

The content of the water-soluble solvent in the total amount of each color ink is, for example, 0.5% by mass to 15.0% by mass, and preferably 1.0% by mass to 8.0% by mass.

5-2. Surfactant

In a synergic combination with the water-soluble solvent described above, a surfactant functions to increase the wettability of the color ink to a recording medium to achieve uniform wettability. As the surfactant, a silicon-based surfactant and an acetylene glycol-based surfactant are preferred.

The silicon-based surfactant functions to uniformly spread ink so as to prevent recording unevenness and blurs of the ink on a recording medium.

As the silicon-based surfactant, a polysiloxane-based compound or the like is preferably used, and examples thereof include polyether-modified organosiloxane and the like. Examples of the polyether-modified organosiloxane include BYK-306, BYK-307, BYK-333, BYK-341, BYK-345, BYK-346, BYK-347, and BYK-348 (all trade names, manufactured by BYK-Chemie, Japan K. K.), KF-351A, KF-352A, KF-353, KF-354L, KF-355A, KF-615A, KF-945, KF-640, KF-642, KF-643, KF-6020, X-22-4515, KF-6011, KF-6012, KF-6015, and KF-6017 (all trade names, manufactured by Shin-Etsu Chemical Co., Ltd.), and the like, and BYK-348 is preferred.

The content of the silicon-based surfactant is preferably 0.1% by mass to 1.5% by mass, based on the total amount of each color ink. When the content of the silicon-based surfactant is less than 0.1% by mass, ink does not easily spread uniformly on a recording medium, which tends to cause recording unevenness and blurs of the ink. In contrast, when the content of the silicon-based surfactant is more than 1.5% by mass, the preservation stability/discharging stability of the aqueous ink cannot be ensured in some cases.

The acetylene glycol-based surfactant has characteristics such that it has an excellent ability to appropriately keep surface tension and interfacial tension and has almost no foaming property, as compared with other surfactants.

In this regard, a color ink including the acetylene glycol-based surfactant can appropriately keep surface tension and the interfacial tension between the ink on a head nozzle face or the like and a printer member that is in contact with the ink. Therefore, when such a color ink is employed in an ink jet recording system, the discharging stability can be improved. In addition, since the color ink including an acetylene glycol-based surfactant exhibits good wettability and permeability to a recording medium, a high-precision image having little recording unevenness and few blurs of the ink can be obtained.

Examples of the acetylene glycol-based surfactant include Surfynol (registered trademark) 104, 104E, 104H, 104A, 104BC, 104DPM, 104PA, 104PG-50, 104S, 420, 440, 465, 485, SE, SE-F, 504, 61, 82, DF37, DF110D, CT111, CT121, CT131, CT136, TG, and GA (all trade names, manufactured by Air Products and Chemicals, Inc.); Olfine (registered trademark) B, Y, P, A, STG, SPC, E1004, E1010, PD-001, PD-002 W, PD-003, PD-004, EXP. 4001, EXP. 4036, EXP. 4051, AF-103, AF-104, AK-02, SK-14, and AE-3 (all trade names, manufactured by Nissin Chemical Industry Co., Ltd.); Acetylenol E00, E00P, E40, and E100 (all trade names, manufactured by Kawaken Fine Chemicals Co., Ltd.); and the like, and Surfynol 104PG-50 and DF110D are preferred.

The content of the acetylene glycol-based surfactant in the total amount of each color ink is preferably 0.05% by mass to 1.0% by mass. When the content of the acetylene glycol-based surfactant is less than 0.05% by mass, the ink does not easily spread uniformly on a recording medium, which easily causes recording unevenness and blurs of the ink. In contrast, when the content of the acetylene glycol-based surfactant is more than 1.0% by mass, the preservation stability/discharging stability of a color ink cannot be ensured in some cases.

In particular, a combination of the silicon-based surfactant and the acetylene glycol-based surfactant having an HLB value of 6 or less is preferred.

By combining the water-soluble solvent and the surfactant, the surface tension of an aqueous ink to be used is preferably in the range of 23.0 mN/m to 40.0 mN/m, and more preferably in the range of 25.0 mN/m to 35.0 mN/m.

5-3. Humectant

Examples of the humectant include polyhydric alcohols, sugars, sugar alcohols, and the like, such as ethylene glycol, diethylene glycol, propylene-glycol, dipropylene glycol, 1,3-propanediol, 1,4-butanediol, hexylene glycol, 2,3-butanediol, and the like.

5-4. Preservative/Fungicide

Examples of the preservative/fungicide include sodium benzoate, sodium pentachlorophenol, sodium 2-pyridinethiol-1-oxide, sodium sorbate, sodium dehydroacetate, 1,2-dibenzisothiazolin-3-one (Proxel CRL, BDN, GXL, XL-2, and TN, manufactured by ICI Corporation), and the like.

5-5. pH Adjuster

Examples of the pH adjuster include amines such as diethanolamine, triethanolamine, propanolamine, morpholine, and the like, and modified products thereof, inorganic bases such as potassium hydroxide, sodium hydroxide, lithium hydroxide, and the like, carbonates such as ammonium hydroxide, quaternary ammonium hydroxide (tetramethyl ammonium and the like), potassium carbonate, sodium carbonate, and lithium carbonate, and other phosphates.

5-6. Solubilizing Aid

Examples of the solubilizing aid include urea, thiourea, dimethylurea, and tetraethylurea.

5-7. Antioxidant/Ultraviolet Light Absorber

Examples of the antioxidant/ultraviolet light absorber include allophanates such as allophanate, methyl allophanate, and the like; biurets such as biuret, dimethyl biuret, tetramethyl biuret, and the like; L-ascorbic acid and salts thereof, and the like; and Tinuvin 328, 900, 1130, 384, 292, 123, 144, 622, 770, and 292, Irgacor 252 and 153, Irganox 1010, 1076, 1035, and MD 1024, manufactured by Ciba-Geigy K. K.; lanthanide oxides; and the like.

5-8. Metal Trapping Agent

Examples of the metal trapping agent include chelating agents such as disodium ethylenediaminetetraacetate and the like.

5-9. Polymerizable Compound and Polymerization Initiator

The resin ink may contain a polymerizable compound, a polymerization initiator, or the like, which is used in the related art, when curing is performed by a polymerization reaction through activated energy rays. Examples of the polymerization initiator include benzoin methyl ether, benzoin ethyl ether, isopropyl benzoin ether, isobutyl benzoin ether, 1-phenyl-1,2-propanedione-2-(o-ethoxycarbonyl)oxime, benzyl, diethoxyacetophenone, benzophenone, chlorothioxantone, 2-chlorothioxantone, isopropylthioxantone, 2-methylthioxantone, polychlorinated polyphenyl, hexachlorobenzene and the like.

Furthermore, examples of the polymerizable compound include polyester acrylate, polyurethane acrylate, epoxy acrylate, polyether acrylate, oligoacrylate, alkyd acrylate, polyol acrylate, diethylene glycol diacrylate, neopentyl glycol diacrylate, 1,6-hexanediol diacrylate, neopentylglycol hydroxypivalate diacrylate, trimethylol propane triacrylate, pentaerythritol triacrylate, dipentaerythritol hexaacrylate, acryloylmorpholine, 2-phenoxyethyl acrylate, hydrogen-(2,2,2-triacryloyloxymethyl)ethyl phthalate, dipentaerythritol polyacrylate, N-vinyl formamide, tripropylene glycol diacrylate, glycerin EO adduct triacrylate, and the like.

2.2. Non-Water-Based Glitter Ink

The non-water-based glitter ink (hereinafter appropriately referred to as a glitter ink) contains a glitter pigment and an organic solvent. Hereinbelow, the components that the non-water-based glitter ink contains will be explained.

1. Glitter Pigment

As a glitter pigment that the non-water-based glitter ink contains, any one which falls in a range capable of discharging the liquid droplets of the ink according to an ink jet recording method can be used. The glitter pigment functions to provide glitter when the glitter ink is adhered onto the resin ink layer, and it can also provide glitter for the adhered. Examples of such a glitter pigment include a pearl pigment and a glitter pigment. Typical examples of the pearl pigment include pigments having pearlescent gloss or interference gloss, such as mica coated with titanium dioxide, fish scale foil, bismuth oxychloride, and the like. On the other hand, examples of the glitter pigment include particles of aluminum, silver, gold, platinum, nickel, chromium, tin, zinc, indium, titanium, copper, or the like, and at least one selected from these single ones or an alloy thereof, and a mixture thereof can be used.

From the viewpoint of the level of a glossy (glitter) and the cost, the glitter pigment used in the present embodiment is preferably aluminum or an aluminum alloy. When the aluminum alloy is used, other metal elements or non-metal elements that can be added to aluminum are not particularly limited as long as the elements have a glitter gloss, but examples thereof include silver, gold, platinum, nickel, chromium, tin, zinc, indium, titanium, copper, and the like. At least one selected from these elements can be preferably used. Further, as the organic solvent as described later used in the glitter ink, one having a low reactivity with a metal is appropriately chosen, and thus, there is no need to subject the glitter pigment used in the invention to a special surface treatment.

The glitter pigment according to the present embodiment has a 50% average particle diameter (d50) in terms of sphere determined by a light scattering method of 0.8 to 1.2 µm.

The 50% average particle diameter in terms of sphere according to a light scattering method is measured and derived as follows. More specifically, the diffraction dispersion light generating by irradiating the particles in a dispersion medium is measured by disposing detectors at each portion of the front side, the lateral side, and the back side, and a point where the distribution curve of the cumulative percentage of the average particle diameter to be measured intersects the horizontal axis of the 50% cumulative percentage is defined as a 50% average particle diameter (d50). Further, the average particle diameter in terms of sphere indicates an average particle diameter determined from measurement results, assuming that particles that are originally amorphous have a spherical shape. As a measurement apparatus, a laser diffraction scattering type particle size distribution measurement apparatus LMS-2000e manufactured by Seishin Enterprise Co., Ltd., and the like are mentioned. Based on the fact that the 50% average particle diameter in terms of sphere (d50) determined by a light scattering method is in the range above, a coating film having high glitter can be formed on recorded matter and ink discharging stability from a nozzle also becomes high.

The glitter pigment is preferably one produced by crushing a metal vapor-deposition film and is preferably in the form of plate-like particles. When the glitter pigment is in the form of plate-like particles and the long diameter, the short diameter, and the thickness on the plane of the plate-like particles are defined as X, Y, and Z, respectively, the 50% average particle diameter R50 of the circle-equivalent diameter determined from the area of the X-Y plane of the plate-like particles is preferably 0.5 to 3 µm and the condition of R50/Z>5 is preferably satisfied.

The "plate-like particles" refer to particles having a substantially flat surface (X-Y plane) and having a substantially uniform thickness (Z). Since the plate-like particles are produced by crushing a metal vapor-deposition film, metal particles having a substantially flat surface and a substantially uniform thickness can be obtained. Accordingly, the long diameter, the short diameter, and the thickness on the plane of the plate-like particles can be defined as X, Y, and Z, respectively.

The "circle-equivalent diameter" refers to, when the substantially flat surface (X-Y plane) of the plate-like particles of the glitter pigment is assumed to be a circle having the same projected area as the projected area of the particles of the glitter pigment, the diameter of the circle. For example, when the substantially flat surface (X-Y plane) of the plate-like particles of the glitter pigment is a polygon, the circle-equivalent diameter of the plate-like particles of the glitter pigment is the diameter of a circle obtained by converting the projected area of the polygon to a circle.

The 50% average particle diameter R50 of the circle-equivalent diameter determined from the area of the X-Y plane of the plate-like particles is more preferably 0.5 to 3 µm, and even more preferably 0.75 to 2 µl from the viewpoint of glitter and recording stability. When the 50% average particle diameter R50 is less than 0.5 µm, the gloss becomes insufficient. In contrast, when the 50% average particle diameter R50 is more than 3 µm, the recording stability decreases.

Furthermore, from the viewpoint of securing high glitter, the relationship between the 50% average particle diameter R50 of the circle-equivalent diameter and the thickness Z is R50/Z>5. When R50/Z is 5 or less, there is a problem in that the glitter is insufficient.

The maximum particle diameter Rmax of the circle-equivalent diameter determined from the area of the X-Y plane of the plate-like particles is preferably 10 µm or less from the viewpoint of preventing clogging of the ink in an ink jet recording apparatus. When the Rmax is adjusted to 10 µm or less, clogging of a nozzle of an ink jet recording apparatus, a mesh filter provided in an ink flow path, and the like can be prevented.

According to a method for producing the glitter pigment, the interface between a metal or alloy layer and a resin layer for peeling of a composite pigment base material having a structure such that the resin layer for peeling and the metal or alloy layer are successively laminated on a sheet-shaped base material is defined as the boundary, the metal or alloy layer is peeled from the sheet-shaped base material, crushed, and pulverized, thereby obtaining plate-like particles. Among the obtained plate-like particles, particles having a 50% average particle diameter in terms of sphere (d50) determined by a light scattering method of 0.8 to 1.2 µm are fractionated. Alternatively, when the long diameter, the short diameter, and the thickness on the plane of the obtained plate-like particles are defined as X, Y, and Z, respectively, particles in which the 50% average particle diameter R50 of the circle-equivalent diameter determined from the area of the X-Y plane of the plate-like particles is 0.5 to 3 µm and the condition of R50/Z>5 is satisfied are fractionated.

The long diameter, the short diameter, and the circle-equivalent diameter on the plane of the glitter pigment can be measured using a particle image analyzer. As the particle image analyzer, for example, flow-type particle image analyzers, FPIA-2100, FPIA-3000, and FPIA-3000S, manufactured by Sysmex Corporation, can be utilized.

The particle size distribution (CV value) of the glitter pigment is determined by the following equation. CV Value=Standard deviation of particle size distribution/Average particle diameter×100 (Equation 1)

The CV value obtained herein is preferably 60 or less, more preferably 50 or less, and even more preferably 40 or less. By selecting a glitter pigment having a CV value of 60 or less, the effect that the recording stability is excellent can be obtained.

The metal or alloy layer is preferably formed by a vacuum deposition method, an ion plating method, or a sputtering method.

The thickness of the metal or alloy layer is preferably 5 nm or more and 100 nm or less, and more preferably 20 nm or more and 100 nm or less. Thus, pigments having an average thickness of preferably 5 nm or more and 100 nm or less, and more preferably 20 nm or more and 100 nm or less are obtained. By setting the thickness to 5 nm or more, the reflectivity and the glitter are excellent and the performance as the glitter pigment becomes high. By setting the thickness to 100 nm or less, an increase in the apparent specific gravity can be suppressed so that the dispersion stability of the glitter pigment can be secured.

The resin layer for peeling in the composite pigment base material is an under coat layer for the metal or alloy layer and is a peelable layer for increasing the peelability from the surface of the sheet-shaped base material. As a resin used in the resin layer for peeling, for example, polyvinyl alcohol, polyvinyl butyral, polyethylene glycols, polyacrylic acid, polyacrylamide, cellulose derivatives, such as cellulose acetate butyrate (CAB), an acrylic acid polymer, and a modified nylon resin are preferred. The layer is formed by applying an aqueous solution of one member or a mixture of two or more members of the above-mentioned resins to a recording medium, drying, and the like. After the application, additives such as a viscosity regulator and the like can be included.

The application of the resin layer for peeling is carried out by gravure coating, roll coating, blade coating, extrusion coating, dip coating, spin coating, or the like, which is generally used. After the application and drying, the surface is smoothed by a calendar treatment, as required.

The thickness of the resin layer for peeling is not particularly limited, but is preferably 0.5 to 50 µm, and more preferably 1 to 10 µm. When the thickness is less than 0.5 µm, the amount as a dispersing resin is insufficient, whereas when, the thickness is more than 50 µm, the layer becomes likely to be peeled off from a pigment layer at the interface when rolled.

The sheet-shaped substrate is not particularly limited, but examples thereof include releasable films, for example, polyester films such as polytetrafluoroethylene, polyethylene, polypropylene, polyethylene terephthalate, and the like, polyamide films such as 66 nylon, 6 nylon, and the like, polycarbonate films, triacetate films, polyimide films, and the like. As the sheet-shaped substrate, polyethylene terephthalate or a copolymer thereof is preferred. The thickness of the sheet-shaped substrate is not particularly limited, but is preferably 10 to 150 µm. When the thickness is 10 µm or more, there is no problem in the handling properties in the processes or the like, whereas when the thickness is 150 µm or less, the softness is excellent and there is no problem in rolling, peeling, or the like.

Moreover, the metal or alloy layer may be sandwiched between protective layers as exemplified in JP-A-2005-68250. Examples of the protective layer include a silicon oxide layer and a protective resin layer.

The silicon oxide layer is not particularly limited as long as the layer contains a silicon oxide, but is preferably formed from silicon alkoxides such as tetraalkoxysilane and the like, or a polymer thereof by a sol-gel method. A coating film of the silicon oxide layer is formed by applying an alcohol solution in which the silicon alkoxide or a polymer thereof has been dissolved, and then heating and firing.

The protective resin layer is not particularly limited as long as the resin is not dissolved in a dispersion medium, but examples thereof include polyvinyl alcohol, polyethylene glycol, polyacrylic acid, polyacrylamide, a cellulose derivative, and the like. The protective resin layer is preferably formed from polyvinyl alcohol or a cellulose derivative such as cellulose acetate butyrate. A layer is formed by applying an aqueous solution of one member or a mixture of two or more members of the resins mentioned above, and drying or the like. In the coating liquid, additives such as a viscosity regulator and the like can be included.

The application of the silicon oxide and the resin is carried out in the same manner as in the application of the resin layer for peeling.

The thickness of the protective layer is not particularly limited, but is preferably in the range of 50 to 150 nm. When the thickness is less than 50 nm, the mechanical strength is insufficient, whereas when the thickness is more than 150 nm, the strength becomes excessively high and thus pulverization and dispersion become difficult, and moreover the protective layer is sometimes peeled at the interface with the metal or alloy layer.

The composite pigment base material can have a layer structure having a plurality of multilayer structures in which the resin layer for peeling, the metal or alloy layer, and the protective layer are successively laminated. The total thickness of the plurality of multilayer structures containing the metal or alloy layer, i.e., the thickness of the metal or alloy layer—the resin layer for peeling—the metal or alloy layer or the resin layer for peeling—the metal or alloy layer, excluding the sheet-shaped substrate and the resin layer for peeling immediately above on the sheet-shaped substrate, is preferably 5000 nm or less. When the total thickness is 5000 nm or less, it is difficult for cracks or peeling to occur even when the composite pigment base material is rolled and the preservation is excellent. Moreover, when formed into pigments, the pigments have excellent glitter and thus are preferable. Further, a structure in which the resin layer for peeling and the metal or alloy layer are successively laminated on each surface of the sheet-shaped substrate can also be mentioned, but the structure is not limited to the structures.

A method for performing a peeling treatment of the metal or alloy layer from the sheet-shaped base material is not particularly limited. Preferred is a method including ejecting a liquid (solvent) to the composite pigment base material, scratching the metal or alloy layer of the composite pigment base material after the liquid is ejected, and collecting the same, a method including performing a peeling treatment by immersing the composite pigment base material into a liquid, or a method including performing ultrasonic treatment simultaneously with immersion into a liquid, and then performing a peeling treatment and pulverizing treatment of the peeled composite pigment. According to the methods, in addition to the peeled metal or alloy layer, the liquid used for the peeling treatment can also be collected. As the liquid (solvent) for use in the peeling treatment, a glycol ether solvent, a lactone solvent, or a mixture thereof is mentioned, for example. A method for crushing and pulverizing the peeled metal or alloy layer is not particularly limited and may be a known method using a ball mill, a bead mill, ultrasonic waves, a jet mill, or the like. Thus, the glitter pigment is obtained.

With regard to the pigment obtained as described above, the resin layer for peeling also serves as a protective colloid, and therefore a stable dispersion can be obtained simply by dispersing in a solvent. In an ink using the pigment, a resin derived from the resin layer for peeling functions to impart adhering properties to a recording medium such as paper and the like.

The concentration of the glitter pigment in ink is preferably 0.5 to 2.0% by mass when only one ink of an ink set is a metallic ink. When the concentration of the glitter pigment in ink is 0.5% by mass or more and less than 1.7% by mass, a glossy surface like a half mirror, that is, glossy feeling, can be obtained by discharging an ink with the amount that is not sufficient for covering a recording surface but recording in which the background is transparent can be achieved. By discharging an ink with the amount that is sufficient for covering a recording surface, a glitter surface having high gloss can be formed. Therefore, it is suitable for the case where half mirror images are formed on a transparent recording medium or the case of expressing a glitter surface having high gloss, for example. Moreover, when the concentration of the glitter pigment in ink is 1.7% by mass or more and 2.0% by mass or less, the glitter pigment is randomly disposed on a recording surface, and thus high gloss cannot be obtained and a matte glitter surface can be formed. Therefore, it is suitable for the case of forming a shielding layer on a transparent recording medium, for example.

2. Organic Solvent

As the organic solvent, a polar organic solvent, such as alcohols (for example, methyl alcohol, ethyl alcohol, propyl alcohol, butyl alcohol, isopropyl alcohol, fluorinated alcohol, and the like), ketones (for example, acetone, methyl ethyl ketone, cyclohexanone, and the like), carboxylates (for example, methyl acetate, ethyl acetate, propyl acetate, butyl acetate, methyl propionate, ethyl propionate, and the like), ethers (for example, diethyl ether, dipropyl ether, tetrahydrofuran, or dioxane, and the like) can be preferably used. In particular, the organic solvent preferably contains one or more kinds of alkylene glycol ether which is liquid under a normal temperature and a normal pressure.

Examples of the alkylene glycol ether include ethylene glycol-based ethers or propylene glycol-based ethers containing, as a base, an aliphatic group, such as methyl, n-propyl, i-propyl, n-butyl, i-butyl, hexyl, and 2-ethyl hexyl, an allyl group having a double bond, and a phenyl group. The alkylene glycol ethers are colorless and have little odor. Since they have an ether group and a hydroxyl group in the molecule, they have the properties of both alcohols and ethers, and are liquid at a normal temperature. Furthermore, the alkylene glycol ethers include monoethers in which only one of the hydroxyl groups is substituted and diethers in which both the hydroxyl groups are substituted, and a plurality of types thereof can be combined for use. In particular, the organic solvent is preferably a mixture of alkylene glycol diether, alkylene glycol monoether, and lactone.

Examples of the alkylene glycol monoether include ethylene glycol monomethyl ether, ethylene glycol monoethyl ether, ethylene glycol monoisopropyl ether, ethylene glycol monobutyl ether, ethylene glycol monohexyl ether, ethylene glycol monophenyl ether, diethylene glycol monomethyl ether, diethylene glycol monoethyl ether, diethylene glycol monobutyl ether, diethylene glycol dimethyl ether, diethylene glycol diethyl ether, triethylene glycol monomethyl ether, triethylene glycol monoethyl ether, triethylene glycol monobutyl ether, tetraethylene glycol monomethyl ether, tetraethylene glycol monoethyl ether, tetraethylene glycol monobutyl ether, propylene glycol monomethyl ether, propylene glycol monoethyl ether, dipropylene glycol monomethyl ether, dipropylene glycol monoethyl ether, and the like.

Examples of the alkylene glycol diether include ethylene glycol dimethyl ether, ethylene glycol diethyl ether, ethylene glycol dibutyl ether, diethylene glycol dimethyl ether, diethylene glycol diethyl ether, diethylene glycol dibutyl ether, triethylene glycol dimethyl ether, triethylene glycol diethyl ether, triethylene glycol dibutyl ether, tetraethylene glycol dimethyl ether, tetraethylene glycol diethyl ether, tetraethylene glycol dibutyl ether, propylene glycol dimethyl ether, propylene glycol diethyl ether, dipropylene glycol dimethyl ether, dipropylene glycol diethyl ether, and the like.

Further, examples of the lactone include γ-butyrolactone, δ-valerolactone, ε-caprolactone, and the like.

The advantages of some aspects of the invention can be achieved more effectively and reliably by using such a favorable composition. In particular, a combination of diethylene glycol diethyl ether and γ-butyrolactone, and/or tetraethylene glycol dimethyl ether, and tetraethylene glycol monobutyl ether is more preferable as a combination of the organic solvents.

3. Fixing Resin

Examples of a resin for use in ink include an acrylic resin, a styrene-acrylic resin, a rosin-modified resin, a terpene resin, a polyester resin, a polyamide resin, an epoxy resin, a vinyl chloride resin, a vinyl chloride-vinyl acetate copolymer, a cellulose resin (for example, cellulose acetate butyrate and hydroxypropyl cellulose), polyvinyl butyral, polyacryl polyol, polyvinyl alcohol, polyurethane, and the like.

Moreover, non-water-based emulsion type polymer particles (NAD=Non Aqueous Dispersion) can also be used as the fixing resin. This is a dispersion in which fine particles of, for example, a polyurethane resin, an acrylic resin, an acrylic polyol resin, or the like are stably dispersed in an organic solvent. Examples of the polyurethane resin include Sanprene IB-501 and Sanprene IB-F370 manufactured by Sanyo Chemical Industries, Ltd., and examples of the acrylic polyol resins include N-2043-60MEX manufactured by Harima Chemicals, Inc.

The resin emulsion is preferably added to the ink in an amount of 0.1% by mass or more and 10% by mass or less in order to further increase the fixability of the glitter pigment to a recording medium. An excessively large amount of the resin emulsion causes insufficient recording stability and an excessively small amount causes insufficient fixability.

The fixing resin in ink is preferably at least one member selected from the group consisting of polyvinyl butyral, cellulose acetate butyrate, and polyacryl polyol and more preferably cellulose acetate butyrate. By using such a suitable composition, preferable effects of favorable scratch resistance during drying, fixability, and high glitter can be acquired.

4. Others

The ink preferably contains at least one glycerin, polyalkylene glycol, or sugars. The total amount of the at least one kind of glycerin, polyalkylene glycol, or sugars is preferably 0.1% by mass or more and 10% by mass or less in ink. By using such a composition, ink discharging is stabilized while preventing the ink from drying and preventing clogging and the image quality of the recorded matter can be made excellent. The polyalkylene glycol is a linear polymer compound having a repetition structure of an ether bond in the main chain and is produced by, for example, ring opening polymerization of a cyclic ether, and the like.

Specific examples of the polyalkylene glycol include a polymer such as polyethylene glycol, polypropylene glycol, and the like, an ethylene oxide-propylene oxide copolymer, and derivatives thereof, and the like. As the copolymer, any copolymer such as a random copolymer, a block copolymer, a graft copolymer, an alternating copolymer, and the like can be used.

Specific preferable examples of the polyalkylene glycol include one represented by the following formula. HO—$(C_nH_{2n}O)_m$—H (wherein n represents an integer of 1 to 5 and m represents an integer of 1 to 100). In the formula, $(C_nH_{2n}O)_m$ may be one fixed number or a combination of two or more kinds of numbers in the range of the integer value n. For example, when n is 3, the formula is $(C_3H_6O)_m$ and when n is a combination of 1 and 4, the formula is $(CH_2O$—$C_4H_8O)_m$. The integer value m may be one fixed number or a combination of two or more kinds of numbers in the range thereof. For example, in the example, when m is a combination of 20 and 40, the formula is $(CH_2O)_{20}$—$(C_2H_4O)_{40}$ and when m is a combination of 10 and 30, the formula is $(CH_2O)_{10}$—$(C_4H_8O)_{30}$. Furthermore, the integer values n and m may be arbitrarily combined in the range above.

Examples of the saccharide include monosaccharides such as pentose, hexose, heptose, octose, and the like, polysaccharides such as disaccharides, trisaccharides, tetrasaccharides, sugar alcohols that are derivatives thereof, reduced derivatives such as deoxy acid, oxidized derivatives such as aldonic acid and uronic acid, and dehydrated derivatives, such as glycoseen, amino acids, and thiosugars. The polysaccharides refer to a wide range of saccharides and include substances widely found in nature, such as alginic acid, dextrin, cellulose, and the like.

The glitter ink may contain a surfactant. Examples of the surfactant that can be used include an acetylene glycol-based surfactant. Specific examples thereof include 2,4,7,9-tetramethyl-5-decyne-4,7-diol, 3,6-dimethyl-4-octyne-3,6-diol, 3,5-dimethyl-1-hexyn-3-ol, and the like, and examples of their commercially available products include Surfynol (registered trademark) 104, 82, 465, 485, and TG (all manufactured by Air Products and Chemicals Inc.), Olfine STG and Olfine E1010 (all manufactured by Nissin Chemical Industry Co., Ltd.), Nissan Nonion A-10R and A-13R (manufactured by Nippon Oil & Fats Co., Ltd.), Flowlen TG-740 W and D-90 (manufactured by Kyoeisha Chemical Co., Ltd.), Emulgen A-90 and A-60 (manufactured by Kao Corporation), Noigen CX-100 (manufactured by Daiichi Kogyo Seiyaku Co., Ltd.), and the like. These polyoxyethylene derivatives may be added singly or in a mixture. Each surfactant can inhibit a glitter ink from being evaporated in a tube which transports an ink composition from an ink cartridge to a printer head, for example, by providing the glitter ink with a volatization-inhibiting property, and thus can prevent or reduce deposition of solid contents in the tube.

Moreover, a non-ionic polyoxyethylene derivative which is liquid at room temperature and atmosphere pressure as a surfactant may be added. Examples thereof include polyoxyethylene alkyl ethers such as polyoxyethylene cetyl ethers (for example, Nissan Nonion P-208 manufactured by Nippon Oil & Fats Co., Ltd.), polyoxyethylene oleyl ethers (for example, Nissan Nonion E-202S and E-205S manufactured by Nippon Oil & Fats Co., Ltd.), and polyoxyethylene lauryl ethers (for example, Emulgen 106 and 108 manufactured by Kao Corporation), polyoxyethylene alkylphenol ethers such as polyoxyethylene octylphenol ethers (for example, Nissan Nonion HS-204, HS-205, HS-206, and HS-208 manufactured by Nippon Oil & Fats Co., Ltd.), sorbitan monoesters such as sorbitan monocaprylate (for example, Nissan Nonion CP-08R manufactured by Nippon Oil & Fats Co., Ltd.) and sorbitan monolaurate (for example, Nissan Nonion LP-20R manufactured by Nippon Oil & Fats Co., Ltd.), polyoxyethylene sorbitan monoesters such as polyoxyethylene sorbitan monostearate (for example, Nissan Nonion OT-221 manufactured by Nippon Oil & Fats Co., Ltd.), polycarboxylic acid-based polymeric surfactants (for example, Flowlen G-70 manufactured by Kyoei Chemical Co., Ltd.), polyoxyethylene higher alcohol ethers (for example, Emulgen 707 and 709 manufactured by Kao Corp.), tetraglycerol oleate (for example, Poem J-4581 manufactured by Riken Vitamin Co., Ltd.), nonylphenol ethoxylate (for example, Adekatol NP-620, NP-650, NP-660, NP-675, NP-683, and NP-686 manufactured by Asahi Denka Co., Ltd.), aliphatic phosphoric esters (for example, Adekacol CS-141E and TS-230E manufactured by Asahi Denka Co., Ltd.), sorbitan sesquioleate (for example, Sorgen 30 manufactured by Daiichi Kogyo Seiyaku Co., Ltd.), sorbitan monooleate (for example, Sorgen 40 manufactured by Daiichi Kogyo Seiyaku Co., Ltd.), polyethylene glycol sorbitan monolaurate (for example, Sorgen TW-20 manufactured by Daiichi Kogyo Seiyaku Co., Ltd.), polyethylene glycol sorbitan monooleate (for example, Sorgen TW-80 manufactured by Daiichi Kogyo Seiyaku Co., Ltd.), and the like.

The ink can be prepared by known common methods. For example, the glitter pigment, a dispersant, and the liquid solvent are mixed first, and a pigment dispersion is prepared using a ball mill, a bead mill, ultrasonic waves, a jet mill, or the like, as required. Then, the pigment dispersion is adjusted to have desired ink properties. Subsequently, a binder resin, the liquid solvent, and other additives (for example, a dispersion aid or a viscosity regulator) are then added to the pigment dispersion while stirring to obtain a pigment ink.

In addition to the above method, a composite pigment base material may be once treated with ultrasonic waves in a liquid solvent to obtain a composite pigment dispersion, and then the composite pigment dispersion may be mixed with a required liquid solvent for ink, or a composite pigment base material can be treated with ultrasonic waves directly in a liquid solvent for ink to be used as ink as it is. In order to adjust the solid content in ink, known methods such as pressure filtration, centrifugal separation, and the like can also be employed.

Although the physical properties of the ink are not particularly limited, the ink preferably has a surface tension of 20 to 50 mN/m. When the surface tension is less than 20 mN/m, the ink is spread over the surface of a printer head for ink jet recording or bleeds out from the head in some cases. As a result, the discharging of liquid droplets of the ink becomes difficult in some cases. When the surface tension is more than 50 mN/m, the ink is not spread over the surface of a recording medium in some cases, and thus favorable recording cannot be performed in some cases.

By using both of the glitter ink and the resin ink, each including an organic solvent as a main component, an image having high glitter with no blur can be obtained. The reason is not clear, but it is presumed to be as follows. For example, by using an organic solvent having high compatibility with a resin contained in the underlayer, the organic solvent in the glitter ink is absorbed or the underlayer is dissolved in the glitter ink, and thus, the smoothness of the plate-shaped particularly glitter pigment, that is particularly aligned, is maintained, and further, blurs are inhibited and higher abrasion resistance is secured.

Examples

4. Examples and Comparative Examples

Hereinbelow, the invention will be described in more detail with reference to the following Examples and Comparative Examples. However, the invention is not intended to limit the scope of the invention.

4.1. Preparation of Resin Ink

The resin ink was prepared by mixing a resin component, a water-soluble organic solvent, a surfactant, a wax, and ion exchange water to the formulation described in Table 1, followed by mixing/stirring at a normal temperature for an hour, thereby obtaining resin inks 1 to 4 described in Table 1.

The components shown in Table 1 are as follows. Further, the units in Table are % by mass.

(1) Resin component/Styrene-acrylic copolymer (thermoplastic resin particles, average particle diameter 50 nm, molecular weight 55000, glass transition temperature 80° C., acid value 130)/Polyurethane (Rezamin D-2020, manufactured by Dainichiseika Colour & Chemicals Mfg. Co., Ltd.) (2) Water-soluble organic solvent/1,2-hexanediol/2-pyrrolidone.propylene glycol (3) Surfactant/silicon-based surfactant (manufactured by BYK-Chemie, Japan K. K., trade name "BYK-348", polyether-modified siloxane)/acetylene glycol-based surfactant (manufactured by Nissin Chemical Industry Co., Ltd.), trade name "Surfynol 104 PG-50") (4) Polyolefin wax/polyethylene wax (manufactured by BYK-Chemie, Japan K. K., trade name "Aquacer-515")

TABLE 1

|  | Resin Ink 1 | Resin Ink 2 | Resin Ink 3 | Resin Ink 4 |
| --- | --- | --- | --- | --- |
| Styrene-acrylic resin | 5 | 5 | 0 | 25 |
| Polyethylene wax | 2 | 0 | 0 | 0 |
| Polyurethane resin | 0 | 0 | 5 | 0 |
| 1,2-Hexanediol | 5 | 5 | 5 | 5 |
| 2-Pyrrolidone | 4 | 4 | 4 | 4 |
| Silicon-based surfactant | 0.5 | 0.5 | 0.5 | 0.5 |
| Acetylene-based surfactant | 0.2 | 0.2 | 0.2 | 0.2 |
| Propylene glycol | 12 | 12 | 12 | 0 |
| Ion exchange water | Balance | Balance | Balance | Balance |
| Total | 100 | 100 | 100 | 100 |

4.2. Preparation of Glitter Pigment Ink

In order to obtain a glitter pigment to be added to a glitter pigment ink, first, a glitter pigment dispersion was prepared as follows.

A resin layer coating liquid containing 3.0% by mass of cellulose acetate butyrate (butylation ratio of 35 to 39%, manufactured by Kanto Chemical Co., Inc.) and 97% by mass of diethylene glycol diethyl ether (manufactured by Nippon Nyukazai Co., Ltd.) was uniformly applied onto a PET film having a film thickness of 100 μm by a bar coating method, and then dried at 60° C. for 10 minutes to form a thin resin layer film on the PET film.

Next, an aluminum vapor-deposition layer having an average film thickness of 20 nm was formed on the above-described resin layer using a vacuum deposition apparatus (VE-1010 type vacuum deposition apparatus manufactured by Vacuum Device Co.).

Next, the laminate formed by the above-described method was simultaneously peeled, pulverized, and dispersed in diethylene glycol diethyl ether using a VS-150 ultrasonic disperser (manufactured by As One Corporation), and a glitter pigment dispersion was prepared by means of an ultrasonic dispersion treatment for 12 cumulative hours.

The glitter pigment dispersion obtained was filtered with an SUS mesh filter having 5 μm openings to remove the coarse particles. Then, the filtrate was poured into a round bottomed flask and the diethylene glycol diethyl ether was distilled off using a rotary evaporator. Thus, the glitter pigment dispersion was concentrated, and then the concentration of the glitter pigment dispersion was adjusted so as to obtain a glitter pigment dispersion 1 with a concentration of 5% by mass.

Then, using a laser diffraction scattering type particle size distribution measurement apparatus LMS-2000e manufactured by Seishin Enterprise Co., Ltd., the 50% average particle diameter in terms of sphere (d50) of the glitter pigment was determined by a light scattering method. As a result, it was found to be 1.001 μm.

A glitter pigment ink was prepared according to the formulations shown in Table 2 using the glitter pigment dispersion 1 which had been prepared by the above-described method. After blending/dissolving the solvent and additives to make an ink dispersion medium, the glitter pigment dispersion 1 was added as it was to the ink solvent, and then mixed/stirred using a magnetic stirrer for 30 minutes at a normal temperature/normal pressure to make glitter pigment inks 1 to 5.

The components shown in Table 2 are as follows. Further, the units in Table are % by mass.
(1) Glitter Pigment (Solid Content)
(2) Organic Solvent
   Diethylene Glycol Diethyl Ether (DEGDE)
   Tetraethylene Glycol Dimethyl Ether (TEGDM)
   γ-Butyrolactone
   Tetraethylene Glycol Monobutyl Ether (TEGMB)
(3) Resin Component
   Cellulose Acetate Butyrate (CAB, manufactured by Kanto Chemical Co., Inc.; butylation ratio of 35 to 39%)
(4) Surfactant
   BYK-UV3500 (trade name, manufactured by BYK-Chemie, Japan K. K.)

TABLE 2

| | Glitter pigment ink 1 | Glitter pigment ink 2 | Glitter pigment ink 3 | Glitter pigment ink 4 | Glitter pigment ink 5 |
|---|---|---|---|---|---|
| DEGDE | 64.95 | 69.95 | 70.05 | 70.1 | 71.15 |
| γ-Butyrolactone | 15 | 10 | 10 | 10 | 12 |
| TEGDM | 15 | 15 | 15 | 15 | 12 |
| TEGMB | 3 | 3 | 3 | 3 | 3 |
| CAB | 0.35 | 0.35 | 0.35 | 0.2 | 0.15 |
| BYK-UV3500 | 0.2 | 0.2 | 0.1 | 0.2 | 0.2 |
| Glitter pigment (solid content) | 1.5 | 1.5 | 1.5 | 1.5 | 1.5 |
| Total | 100 | 100 | 100 | 100 | 100 |

4.3. Preparation of Sample for Evaluation

Two kinds of underlayers, an underlayer obtained by a firstly forming an underlayer including drying and an underlayer obtained by a secondly forming an underlayer not including drying, were formed. The two kinds of underlayers were each provided with glitter layers. Details of these are explained below.

4.3.1. Preparation of Sample for Evaluation Using First Underlayer Forming Step

Each of the samples of Examples and Comparative Examples was prepared using an ink jet printer SP-300V (manufactured by Roland D. G. Corporation) as an ink jet recording apparatus. The above-described resin ink and the glitter pigment ink were used, respectively, instead of cyan ink and yellow ink in the printer. Further, magenta ink and black ink were used as they were. In addition, the printer was modified to have a temperature-controlled roller so as to heat the recording medium in the printer position.

First, the resin ink shown in Table 3 was applied onto the recording medium shown in Table 3 at a predetermined pattern of the duty (%) shown in Table 3, and then subjected to drying, thereby forming an underlayer. Further, at every 100% duty (%), drying was provided and drying was carried out by a platen that had been heated to 50° C. Then, the glitter pigment ink 1 was applied onto the formed underlayer at a predetermined pattern of the duty (%) shown in Table 3 and an image was formed, thereby obtaining recorded matter (Examples 1A to 7A, 1B to 7B, and 1C to 7C). Further, in the same manner as in Examples 1A to 6A except that underlayers were not formed in Comparative Examples 1 to 7, recorded matter was obtained. Further, as Reference Example 1, the glitter pigment ink 1 was applied onto a PVC film on which an underlayer had not been formed, thereby obtaining recorded matter.

Furthermore, an underlayer was formed to a dried film thickness of 20 μm on the recording medium shown in Table 3, using a coating apparatus K Hand Coater (manufactured by Matsuo Industry Corporation), and Bar No. 7. Further, the formed underlayer was subjected to drying (in which the underlayer was heated at 50° C.), on which the glitter pigment ink 1 was then applied at a predetermined pattern of the duty (%) shown in Table 3, and an image was formed, thereby obtaining recorded matter (Examples 1D to 7D).

Moreover, the recording media shown in Table 3 are as follows.
(1) PET 1: manufactured by Lintec Corporation, trade name "PET50A"
(2) PET 2: manufactured by Lintec Corporation, trade name "K2411"
(3) Synthetic paper: PP stretching-processed film, manufactured by Lintec Corporation, trade name "YUPO 80"
(4) Cast paper: manufactured by Ojitac Co., Ltd., trade name "O MILLER 73/F41/U8C"
(5) Coated paper: manufactured by Lintec Corporation, trade name "NP COAT_PW8E"
(6) Plain paper: manufactured by Fuji Xerox Co., Ltd., trade name "Xerox P"
(7) Wood free paper: manufactured by Lintec Corporation, trade name "55PW8R"
(8) PVC: manufactured by Roland Corporation, trade name "LLEX"

Further, in the above-described recording media, PET 1, PET 2, synthetic paper, cast paper, and coated paper were "non-absorbing or low ink-absorbing recording media", and the plain paper and wood free paper correspond to "recording media having an arithmetic mean roughness Ra of 20 μm or more at a surface on which ink is recorded".

4.3.2. Preparation of Sample for Evaluation Using Second Underlayer Forming Step In the same manner as in the section "4.3.1. Preparation of Sample for Evaluation Using First Underlayer Forming Step" except that underlayers were formed on the above-described plain paper and wood free paper by a secondly forming an underlayer not including drying, samples for evaluation were prepared (Examples 6E and 7E). The results are shown in Table 4.

4.4. Evaluation of Recorded Matter

1. Evaluation of Gloss

On the recording surface of the recorded matter according to each of the Examples, Comparative Examples, and Reference Examples above, the glossy was measured at a swing angle of 60° using a glossmeter (Minolta Multi Gloss 268).

S: Degree of gloss is 401 or more.
A: Degree of gloss is 291 or more and less than 401.
B: Degree of gloss is 171 or more and less than 291.
C: Degree of gloss is 51 or more and less than 171.
D: Degree of gloss is less than 51.

2. Abrasion Resistance Test

Evaluation of abrasion resistance was carried out by setting a recording matter after drying set in a Color Fastness Rubbing Tester AB-301 (trade name, manufactured by Tester Sangyo Co., Ltd.), and rubbing it 10 times using a friction element (load; 300 g) having a contact portion to which a white cotton cloth (in accordance with JIS L 0803) was attached. Further, when a resin ink layer was not provided, a case where improvement of abrasion resistance could be observed is denoted as "○" and a case where change in abrasion resistance could not be observed is denoted as "-".

These results are shown in Tables 3 and 4.

As is clear from Tables 3 and 4, the recorded matter obtained according to the ink jet recording method of an aspect of the invention had excellent glitter or abrasion resistance, whereas satisfactory results could not obtained in the Comparative Examples.

Furthermore, in the same manner as in the section "4.3.1. Preparation of Sample for Evaluation Using First Underlayer Forming Step" except that in Table 3, the glitter ink 1 used in Examples 1A to 7A, 1B to 7B, 1C to 7C, and 1D to 7D, Comparative Examples 1 to 7, and Reference Example 1 was changed to glitter ink 2, recorded matter according to Examples 8A to 14A, 8B to 14B, 8C to 14C, and 8D to 14D, and Comparative Examples 8 to 14, and Reference Examples 2 was obtained. With regard to the obtained recorded matter, "Evaluation of Gloss" and "Abrasion Resistance Test" as described above were carried out, and the results are the same as shown in Table 3.

Moreover, in the same manner as in the section "4.3.1. Preparation of Sample for Evaluation Using First Underlayer Forming Step" except that in Table 3, the glitter ink 1 used in Examples 1A to 7A, 1B to 7B, 1C to 7C, and 1D to 7D, Comparative Examples 1 to 7, and Reference Example 1 was changed to glitter ink 3, recorded matter according to Examples 15A to 21A, 15B to 21B, 15C to 21C, and 15D to 21D, Comparative Examples 15 to 21, and Reference Example 3 was obtained. With regard to the obtained recorded matter, "Evaluation of Gloss" and "Abrasion Resistance Test" as described above were carried out, and the results are the same as shown in Table 3.

Furthermore, in the same manner as in the section "4.3.1. Preparation of Sample for Evaluation Using First Underlayer Forming Step" except that in Table 3, the glitter ink 1 used in Examples 1A to 7A, 1B to 7B, 1C to 7C, and 1D to 7D, Comparative Examples 1 to 7, and Reference Example 1 was changed to glitter ink 4, recorded matter according to Examples 22A to 28A, 22B to 28B, 22C to 28C, and 22D to 28D, Comparative Examples 22 to 28, and Reference Example 4 was obtained. With regard to the obtained recorded matters, "Evaluation of Gloss" and "Abrasion Resistance Test" as described above were carried out, and the results are the same as shown in Table 3.

Moreover, in the same manner as in the section "4.3.1. Preparation of Sample for Evaluation Using First Underlayer Forming Step" except that in Table 3, the glitter ink 1 used in Examples 1A to 7A, 1B to 7B, 1C to 7C, and 1D to 7D, Comparative Examples 1 to 7, and Reference Example 1 was changed to glitter ink 5, recorded matter according to Examples 29A to 35A, 29B to 35B, 29C to 35C, and 29D to 35D, Comparative Examples 29 to 35, and Reference Example 5 was obtained. With regard to the obtained recorded matter, "Evaluation of Gloss" and "Abrasion Resistance Test" as described above were carried out, and the results are the same as shown in Table 3.

TABLE 3

| | | Resin ink | | Glitter pigment ink | | Heating treatment carried out (in formation of underlayer) | |
|---|---|---|---|---|---|---|---|
| | Recording medium | No. | Duty (%) | No. | Duty (%) | Degree of gloss at 60° | Abrasion resistance |
| Example 6A | Plain paper | 1 | 500% | 1 | 90% | A | — |
| | | | 400% | | 90% | A | — |
| | | | 300% | | 90% | B | — |
| | | | 200% | | 90% | B | — |
| | | | 100% | | 90% | C | — |
| Example 6B | Plain paper | 2 | 500% | 1 | 90% | A | — |
| | | | 400% | | 90% | A | — |
| | | | 300% | | 90% | B | — |
| | | | 200% | | 90% | B | — |
| | | | 100% | | 90% | C | — |
| Example 6C | Plain paper | 3 | 500% | 1 | 90% | A | — |
| | | | 400% | | 90% | A | — |
| | | | 300% | | 90% | B | — |
| | | | 200% | | 90% | B | — |
| | | | 100% | | 90% | C | — |
| Example 6D | Plain paper | 4 | — | 1 | 90% | A | — |
| Comparative Example 6 | Plain paper | — | 0% | 1 | 90% | D | — |
| Example 7A | Wood free paper | 1 | 500% | | 90% | A | — |
| | | | 400% | | 90% | B | — |
| | | | 300% | | 90% | C | — |
| | | | 200% | | 90% | C | — |
| | | | 100% | | 90% | D | — |

TABLE 3-continued

| | | Resin ink | | Glitter pigment ink | | Heating treatment carried out (in formation of underlayer) | |
|---|---|---|---|---|---|---|---|
| | Recording medium | No. | Duty (%) | No. | Duty (%) | Degree of gloss at 60° | Abrasion resistance |
| Example 7B | Wood free paper | 2 | 500% | 1 | 90% | A | — |
| | | | 400% | | 90% | B | — |
| | | | 300% | | 90% | C | — |
| | | | 200% | | 90% | C | — |
| | | | 100% | | 90% | D | — |
| Example 7C | Wood free paper | 3 | 500% | 1 | 90% | A | — |
| | | | 400% | | 90% | B | — |
| | | | 300% | | 90% | C | — |
| | | | 200% | | 90% | C | — |
| | | | 100% | | 90% | D | — |
| Example 7D | Wood free paper | 4 | — | 1 | 90% | A | — |
| Comparative Example 7 | Wood free paper | — | 0% | 1 | 90% | D | — |
| Reference Example | LLEX | | 0% | | 100% | A | — |
| | | | 0% | | 90% | A | — |
| | | | 0% | | 80% | A | — |
| | | | 0% | | 70% | A | — |
| | | | 0% | | 60% | A | — |
| | | | 0% | | 50% | B | — |

TABLE 4

| | | Resin ink | | Glitter pigment ink | | Heating treatment not carried out (in formation of underlayer) | |
|---|---|---|---|---|---|---|---|
| | Recording medium | No. | Duty (%) | No. | Duty (%) | Degree of gloss at 60° | Abrasion resistance |
| Example 6E | Plain paper | 1 | 500% | 1 | 90% | A | — |
| | | | 400% | | 90% | B | — |
| | | | 300% | | 90% | B | — |
| | | | 200% | | 90% | C | — |
| | | | 100% | | 90% | D | — |
| Comparative Example 6 | Plain paper | — | 0% | | 90% | D | — |
| Example 7E | Wood free paper | 1 | 500% | 1 | 90% | B | — |
| | | | 400% | | 90% | B | — |
| | | | 300% | | 90% | C | — |
| | | | 200% | | 90% | D | — |
| | | | 100% | | 90% | D | — |
| Comparative Example 7 | Wood free paper | — | 0% | 1 | 90% | D | — |

3. Evaluation of Underlayer (Resin Ink Layer)

Figure 2:
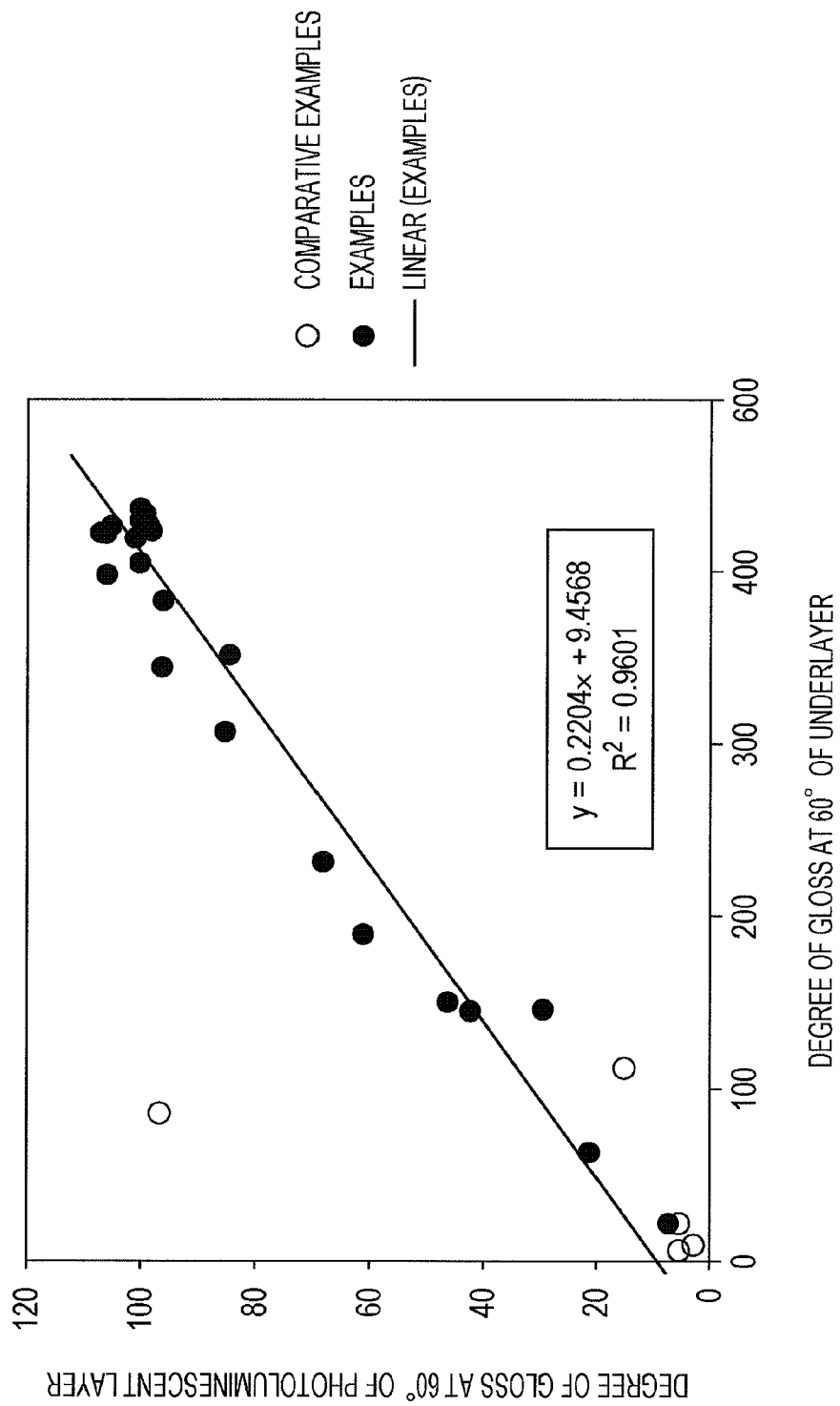
FIG. 2 is a graph showing the relationship between the glossy of the resin ink layer and the glossy of a glitter ink layer.

With regard to the underlayers according to Examples 1A to 3A, 5A, and 7A, and Comparative Examples 1 to 3, 5, and 7 as described above, measurement was carried out as in "(1) Evaluation of Gloss" above. The results are shown in Table 5. Further, in Table 5, the "Degrees of Gloss at 60° of Glitter Layer" are the degrees of gloss at 60° of Examples and Comparative Examples in Table 3. Further, as shown in Table 5, a correlation diagram in which the "Degrees of Gloss at 60° of Glitter Layer" shown in Table 5 are plotted in the horizontal axis and the "Degrees of Gloss at 60° of Underlayer" are plotted in the vertical axis is shown in FIG. 2. In addition, in the "Degrees of Gloss at 60° of Glitter Layer" and "Gloss at 60° of Underlayers" according to Examples 1A to 3A, 5A, and 7A, approximation equations and correlation coefficients calculated using a least squares method are also shown.

TABLE 5

| | | Resin ink | | Glitter pigment ink | | Heating treatment carried out (in formation of underlayer) | |
|---|---|---|---|---|---|---|---|
| | Recording medium | No. | Duty (%) | No. | Duty (%) | Degree of gloss at 60° | Abrasion resistance |
| Example 1A | PET 1 | 1 | 500% | 1 | 90% | 105 | 426 |
| | PET 1 | | 400% | | 90% | 105 | 427 |
| | PET 1 | | 300% | | 90% | 106 | 423 |

TABLE 5-continued

| | Recording medium | Resin ink No. | Resin ink Duty (%) | Glitter pigment ink No. | Glitter pigment ink Duty (%) | Heating treatment carried out (in formation of underlayer) Degree of gloss at 60° | Heating treatment carried out (in formation of underlayer) Abrasion resistance |
|---|---|---|---|---|---|---|---|
| | PET 1 | | 200% | | 90% | 107 | 423 |
| | PET 1 | | 100% | | 90% | 106 | 399 |
| Comparative Example 1 | PET 1 | — | 0% | 1 | 90% | 96.4 | 87 |
| Example 2A | PET 2 | 1 | 500% | 1 | 90% | 98.2 | 425 |
| | PET 2 | | 400% | | 90% | 100 | 437 |
| | PET 2 | | 300% | | 90% | 100 | 430 |
| | PET 2 | | 200% | | 90% | 101 | 421 |
| | PET 2 | | 100% | | 90% | 96.2 | 384 |
| Comparative Example 2 | PET 2 | — | 0% | 1 | 90% | 5.1 | 22 |
| Example 3A | Synthetic paper | 1 | 500% | 1 | 90% | 99.7 | 432 |
| | Synthetic paper | | 400% | | 90% | 100 | 436 |
| | Synthetic paper | | 300% | | 90% | 100 | 406 |
| | Synthetic paper | | 200% | | 90% | 96.1 | 346 |
| | Synthetic paper | | 100% | | 90% | 61 | 190 |
| Comparative Example 3 | Synthetic paper | — | 0% | 1 | 90% | 2.8 | 9 |
| Example 5A | Coated paper | 1 | 500% | 1 | 90% | 99.2 | 435 |
| | Coated paper | | 400% | | 90% | 98.6 | 428 |
| | Coated paper | | 300% | | 90% | 84.3 | 352 |
| | Coated paper | | 200% | | 90% | 46 | 150 |
| | Coated paper | | 100% | | 90% | 29.5 | 146 |
| Comparative Example 5 | Coated paper | — | 0% | 1 | 90% | 14.9 | 112 |
| Example 7A | Wood free paper | 1 | 500% | 1 | 90% | 85.4 | 307 |
| | Wood free paper | | 400% | | 90% | 68.1 | 232 |
| | Wood free paper | | 300% | | 90% | 42.1 | 145 |
| | Wood free paper | | 200% | | 90% | 21.3 | 62 |
| | Wood free paper | | 100% | | 90% | 7 | 22 |
| Comparative Example 7 | Wood free paper | — | 0% | 1 | 90% | 5 | 5 |

As is clear from FIG. 2, according to the ink jet recording method of an aspect of the invention, an underlayer which has excellent absorption and excellent smoothness can be provided on various recording media. Therefore, a glitter layer which is excellent in a glossy and abrasion resistance can be obtained.

What is claimed is:

1. An ink jet recording method for recording a non-water-based glitter ink having a glitter pigment dispersed therein on a recording medium by an ink jet, the method comprising:
   forming an underlayer, in which a resin ink in which resin components and a polysiloxane surfactant are dispersed or dissolved in a dispersion medium is applied to at least a site of the recording medium on which the non-water-based glitter ink is recorded, thereby forming an underlayer, and
   recording a glitter ink, in which the non-water-based glitter ink is recorded on the underlayer, and
   wherein the recording medium is a non-absorbing or low ink-absorbing recording medium or a recording medium having an arithmetic mean roughness Ra of the surface, on which the resin ink is recorded, of 20 μm or more.

2. The ink jet recording method according to claim 1, wherein the arithmetic mean roughness Ra of the underlayer is 20 μm or less.

3. The ink jet recording method according to claim 1, wherein the gloss at 60° of the underlayer is 20 or more.

4. The ink jet recording method according to claim 1, further comprising drying the underlayer.

5. The ink jet recording method according to claim 4, wherein a drying temperature in the step of drying the underlayer is in the range of 30° C. to 120° C.

6. The ink jet recording method according to claim 1, wherein the step of forming the underlayer does not include drying.

7. The ink jet recording method according to claim 1, wherein the resin component is at least one selected from the group consisting of a styrene-acrylic acid copolymer and a polyurethane.

8. The ink jet recording method of claim 1, wherein the resin ink includes a water-soluble solvent.

9. The ink jet recording method of claim 8, wherein the water-soluble resin solvent is selected from the group consisting of monohydric alcohols having 1 to 4 carbon atoms and polyhydric alcohols having 2 to 6 carbon atoms.

10. The ink jet recording method of claim 9, wherein the monohydric alcohol is selected from the group consisting of methanol, ethanol, n-propanol, i-propanol, and n-butanol.

11. The ink jet recording method of claim 9, wherein the polyhydric alcohol is selected from the group consisting of 1,2-hexanediol, 1,3-hexanediol, 1,2-heptanediol, 1,3-heptanediol, 1,2-octanediol, 1,3-octanediol, and 1,2-pentanediol.

12. The ink jet recording method of claim 1, wherein a content of the polysiloxane surfactant is 0.1 to 1.5% by mass.

* * * * *